(12) United States Patent
Xue et al.

(10) Patent No.: US 9,705,747 B1
(45) Date of Patent: Jul. 11, 2017

(54) DISTRIBUTED PATH SELECTION IN HYBRID NETWORKS

(71) Applicant: QUALCOMM Incorporated, San Diego, CA (US)

(72) Inventors: Qi Xue, San Diego, CA (US); Peerapol Tinnakornsrisuphap, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 23 days.

(21) Appl. No.: 14/089,086

(22) Filed: Nov. 25, 2013

Related U.S. Application Data

(60) Provisional application No. 61/956,164, filed on Dec. 4, 2012.

(51) Int. Cl.
*H04L 12/24* (2006.01)

(52) U.S. Cl.
CPC .................................. *H04L 41/12* (2013.01)

(58) Field of Classification Search
CPC ... H04L 12/462; H04L 12/64; H04L 12/6402; H04L 45/12; H04L 45/38; H04L 45/54; H04L 45/66
See application file for complete search history.

(56) References Cited

U.S. PATENT DOCUMENTS

| | | | |
|---|---|---|---|
| 5,233,604 A * | 8/1993 | Ahmadi et al. | 370/238 |
| 5,995,503 A | 11/1999 | Crawley et al. | |
| 6,073,248 A | 6/2000 | Doshi et al. | |
| 6,888,842 B1 | 5/2005 | Kirkby et al. | |
| 6,973,023 B1 | 12/2005 | Saleh et al. | |
| 7,103,640 B1 | 9/2006 | Overton et al. | |
| 7,327,683 B2 | 2/2008 | Ogier et al. | |
| 7,366,113 B1 | 4/2008 | Chandra et al. | |
| 7,725,035 B2 | 5/2010 | Tyan et al. | |
| 7,869,382 B2 | 1/2011 | Hamedi et al. | |
| 7,987,489 B2 | 7/2011 | Krzyzanowski et al. | |
| 8,165,121 B1 | 4/2012 | Singh | |

(Continued)

FOREIGN PATENT DOCUMENTS

| | | |
|---|---|---|
| CN | 101237399 A | 8/2008 |
| CN | 101980565 A | 2/2011 |
| WO | 2011128002 A1 | 10/2011 |

OTHER PUBLICATIONS

"IEEE P1905.1/D05 Draft Standard for a Convergent Digital Home Network for Heterogeneous Technologies", XP055047812. ISBN: 978-0-73-817434-1 Retrieved from the Internet: URL:http://ieeexplore.ieee.org/servlet/opac?punumber=6197675[retrieved on Dec. 13, 2012] May 5, 2012, 82 pages.

(Continued)

*Primary Examiner* — Anh-Vu Ly
*Assistant Examiner* — Hector Reyes Ortiz
(74) *Attorney, Agent, or Firm* — DeLizio Law, PLLC

(57) ABSTRACT

A hybrid device may independently select a next hop for a packet stream based upon a path selection algorithm. The path selection algorithm includes calculating end-to-end path capacity for candidate paths to a destination device. End-to-end path capacity is calculated based upon contention groups of particular links in at least one of the plurality of paths. Selected paths are recorded in a stream forwarding table for use with subsequent packets of a packet stream.

33 Claims, 20 Drawing Sheets

DIRECT LEGACY NEIGHBOR DISCOVERY

(56) References Cited

U.S. PATENT DOCUMENTS

| | | | |
|---|---|---|---|
| 8,296,424 | B2 | 10/2012 | Malloy et al. |
| 8,369,220 | B1 | 2/2013 | Khanna et al. |
| 8,570,859 | B1 | 10/2013 | Satapathy et al. |
| 8,769,148 | B1 * | 7/2014 | Singh .................. H04L 45/7453 709/242 |
| 9,184,998 | B2 | 11/2015 | Xue |
| 2005/0111487 | A1 | 5/2005 | Matta et al. |
| 2005/0128995 | A1 | 6/2005 | Ott et al. |
| 2005/0232157 | A1 | 10/2005 | Tyan et al. |
| 2005/0265255 | A1 | 12/2005 | Kodialam et al. |
| 2006/0077918 | A1 | 4/2006 | Mao et al. |
| 2006/0182035 | A1 | 8/2006 | Vasseur |
| 2007/0104215 | A1 * | 5/2007 | Wang et al. .................. 370/458 |
| 2007/0183317 | A1 | 8/2007 | Vasseur et al. |
| 2008/0298250 | A1 | 12/2008 | Larsson |
| 2009/0059814 | A1 | 3/2009 | Nixon et al. |
| 2009/0067834 | A1 | 3/2009 | Lu |
| 2009/0168653 | A1 * | 7/2009 | St. Pierre et al. ............ 370/238 |
| 2009/0238074 | A1 | 9/2009 | Vasseur et al. |
| 2009/0303882 | A1 | 12/2009 | Tanaka et al. |
| 2009/0316602 | A1 | 12/2009 | Nandy et al. |
| 2010/0085916 | A1 * | 4/2010 | Yu et al. ....................... 370/328 |
| 2010/0085948 | A1 * | 4/2010 | Yu et al. ....................... 370/338 |
| 2010/0309912 | A1 | 12/2010 | Mehta et al. |
| 2011/0064079 | A1 * | 3/2011 | Lim et al. ..................... 370/390 |
| 2012/0176914 | A1 | 7/2012 | Choudhury et al. |
| 2012/0207163 | A1 | 8/2012 | Schrum |
| 2012/0224503 | A1 | 9/2012 | Schrum, Jr. et al. |
| 2012/0230343 | A1 * | 9/2012 | Schrum, Jr. .................. 370/401 |
| 2012/0231828 | A1 | 9/2012 | Wang et al. |
| 2012/0236726 | A1 | 9/2012 | Shihada et al. |
| 2012/0236870 | A1 * | 9/2012 | Klein ........................... 370/401 |
| 2012/0239794 | A1 * | 9/2012 | Klein ........................... 709/223 |
| 2012/0257545 | A1 * | 10/2012 | Al Agha et al. .............. 370/255 |
| 2012/0320919 | A1 | 12/2012 | Baliga et al. |
| 2012/0320924 | A1 | 12/2012 | Baliga et al. |
| 2013/0024706 | A1 | 1/2013 | Katar et al. |
| 2013/0044753 | A1 | 2/2013 | Huang et al. |
| 2013/0114409 | A1 * | 5/2013 | Iovanna et al. ............... 370/235 |
| 2013/0121157 | A1 | 5/2013 | Logvinov et al. |
| 2013/0132603 | A1 | 5/2013 | Cohen et al. |
| 2013/0132604 | A1 * | 5/2013 | Cohen et al. .................. 709/231 |
| 2013/0138832 | A1 | 5/2013 | Qi et al. |
| 2013/0188514 | A1 * | 7/2013 | Jain ............................... 370/254 |
| 2014/0003336 | A1 | 1/2014 | Padden et al. |

OTHER PUBLICATIONS

Raniwala A., et al., "Architecture and algorithms for an IEEE 802.11-based multi-channel wireless mesh network", INFOCOM 2005. 24th Annual Joint Conference of the IEEE Computer and Communications Societies, Proceedings IEEE Miami, FL. USA, Mar. 13-17, 2005, Piscataway, NJ, USA, IEEE, Piscataway, NJ, USA, vol. 3, Mar. 13, 2005 (Mar. 13, 2005), pp. 2223-2234, XP010829112, DOI: 10.1109/INFCOM.2005.1498497, ISBN: 978-0-7803-8968-7, sections I and IV.

"PCT Application No. PCT/US2013/072639 International Search Report and Written Opinion", Mar. 5, 2014, 13 pages.

"PCT Application No. PCT/US2013/072641 International Search Report", Mar. 24, 2014, 11 pages.

Co-Pending U.S. Appl. No. 13/827,338, filed Mar. 14, 2013, 63 pages.

Co-pending U.S. Appl. No. 13/828,776, filed Mar. 14, 2013, 65 pages.

Fedyk, et al., "IS-IS Extensions Supporting IEEE 802.1aq Shortest Path Bridging," Internet Engineering Task Force (IETF), Request for Comments: 6329, Apr. 2012, 37 pp.

Wikipedia, "IEEE 802.1aq (Redirected from Shortest Path Bridging)," retrieved from http://en.wikipedia.org/wiki/Shortest_path_bridging on Oct. 12, 2012, 13 pp.

Co-pending U.S. Appl. No. 14/096,389, filed Dec. 4, 2013, 86 pages.

Co-pending U.S. Appl. No. 14/089,611, filed Nov. 25, 2013, 85 pages.

"PCT Application No. PCT/US2013/072639 Written Opinion", Mar. 5, 2015, 6 pages.

"PCT Application No. PCT/US2013/072641 Written Opinion", Mar. 6, 2015, 6 pages.

"U.S. Appl. No. 13/827,338 Office Action", Jan. 16, 2015, 15 pages.

"U.S. Appl. No. 14/089,611 Final Office Action", Nov. 20, 2015, 32 pages.

"U.S. Appl. No. 13/828,776 Final Office Action", Oct. 15, 2015, 31 pages.

"PCT App. No. PCT/US2013/072641 International Preliminary Report on Patentability", Jun. 25, 2015, 9 pages.

"PCT Application No. PCT/US2013/072639 International Preliminary Report on Patentability", Jun. 25, 2015, 9 pages.

"U.S. Appl. No. 13/828,776 Office Action", Apr. 23, 2015, 30 pages.

"U.S. Appl. No. 14/089,611 Office Action", Jun. 25, 2015, 24 pages.

"U.S. Appl. No. 14/096,389 Office Action", Jun. 19, 2015, 36 pages.

* cited by examiner

STREAM FORWARDING TABLE ENTRY

| Field name | Type | Description |
|---|---|---|
| *Stream Identification fields* | | |
| SA MAC address | EUI-48 | SA MAC address of the stream |
| DA MAC address | EUI-48 | DA MAC address of the stream |
| SPORT | Integer | Source port of the stream |
| DPORT | Integer | Destination port of the stream |
| Protocol | Integer | IP header protocol field of the stream |
| *Forwarding decision fields* | | |
| timestamp | Unix timestamp | Last time the forwarding decision fields are updated/created |
| Egress IL MAC | EUI-48 | IL MAC of the egress interface at the current HD |
| Next hop IL MAC | EUI-48 | IL MAC of the next hop HD |
| *Stream Info fields* | | |
| Ingress IL MAC | EUI-48 | IL MAC of the latest ingress interface at the HD |
| PCP/DSCP | Integer | the PCP/DSCP field of the packets |
| Stream Medium Utilization (SMU) | Integer | the percentage of time used by the stream on the egress interface |
| Stream data rate (SDR) | Integer | the incoming data rate (in bps) of the stream at the HD |

FIG. 18

CONFIGURABLE PARAMETERS

| Parameter | Default value | Description |
|---|---|---|
| LINK_METRICS_MEASURE_INTVL | 1 second | Local link metrics measurement interval on a HD |
| LINK_METRICS_QUERY_INTVL | 5 second | Link metrics query interval from a HD to other HDs |
| STREAM_TABLE_TIMEOUT | 300 seconds | Max duration for a stream to be active w/o any incoming packet |
| CONGESTED_LINK_PDR | 5% | PDR threshold for a link to be considered congested |
| SATURATED_LINK_MU | 70% | MU threshold for a link to be considered congested |
| SATURATED_LINK_BU | 70% | BU threshold for a link to be considered congested |
| TOPOLOGY_TIMEOUT | 120 seconds | Timeout value before link failure is triggered at a HD upon the absence of P1905.1 topology discovery message |
| DLN_PRUNING_TIMER | 1 second | Timeout value before DLN prunning is triggered at a HD upon legacy neighbor list update |
| MIN_STREAM_DURATION | 5 seconds | Minimum time before changing the egress decision of a stream on a HD |
| CONGESTION_UPDATE_PROBABILITY | 0.6 | Probability for moving a congested stream to a new path |
| SATURATION_UPDATE_PROBABILITY | 0.3 | Probability for moving a saturated stream to a new path |

FIG. 19

DISTRIBUTED PATH SELECTION IN HYBRID NETWORKS

RELATED APPLICATIONS

This application claims the priority benefit of U.S. Provisional Application Ser. No. 61/956,164 filed Dec. 4, 2012.

BACKGROUND

Embodiments of the inventive subject matter generally relate to the field of communication systems, and, more particularly, to selecting paths for packet streams in a hybrid network.

Traditional routing or bridging protocols are capable of determining paths through particular networks. For example, IEEE 802.1aq defines a Shortest Path Bridging (SPB) protocol for Ethernet networks. Other routing protocols may exist for other network technologies.

For a hybrid network, traditional routing and bridging protocols are inefficient or unusable. Hybrid communication networks typically comprise multiple networking technologies (e.g., wireless local area network (WLAN) technologies, powerline communication technologies, Ethernet, etc.) that may be interconnected using bridging-capable devices that forward packets between devices utilizing the different network technologies and media in order to form a single extended communication network. The hybrid network can comprise hybrid devices and conventional (or legacy) communication devices. Moreover, the hybrid network may use multiple network technologies in a variety of topology configurations.

Typically, the hybrid devices implement topology discovery and other information exchange protocols to advertise their presence to other hybrid devices in the hybrid network. However, the legacy devices (including legacy bridges) may not implement the topology discovery and information exchange protocols and may not advertise their presence within the hybrid network. Existing topology discovery techniques may rely on direct exchange of information between endpoint communication devices, or manual configuration of topology information (e.g. virtual LANs, bridge priorities, or explicit routing rules) that can be too complicated for average users.

Therefore, traditional methods for determining network topology and for selecting a path for a packet stream are inadequate.

SUMMARY

Various embodiments are described for path selection in a hybrid network. In an example embodiment, an incoming packet is received at a first hybrid device. A destination device is determined based upon a destination address in the incoming packet. Path capacities for a plurality of paths through a hybrid network to the destination device are calculated based, at least in part, upon contention groups of particular links in at least one of the plurality of paths. One of the plurality of paths to the destination device is selected at the first hybrid device based upon the calculated path capacities.

BRIEF DESCRIPTION OF THE DRAWINGS

The present embodiments may be better understood, and numerous objects, features, and advantages made apparent to those skilled in the art by referencing the accompanying drawings.

FIG. 18 is a table illustrating example data fields in a stream forwarding table used in a hybrid network.

FIG. 19 is a table illustrating example configurable parameters related to topology mapping and path selection in a hybrid network.

DESCRIPTION OF EMBODIMENT(S)

Figure 1:
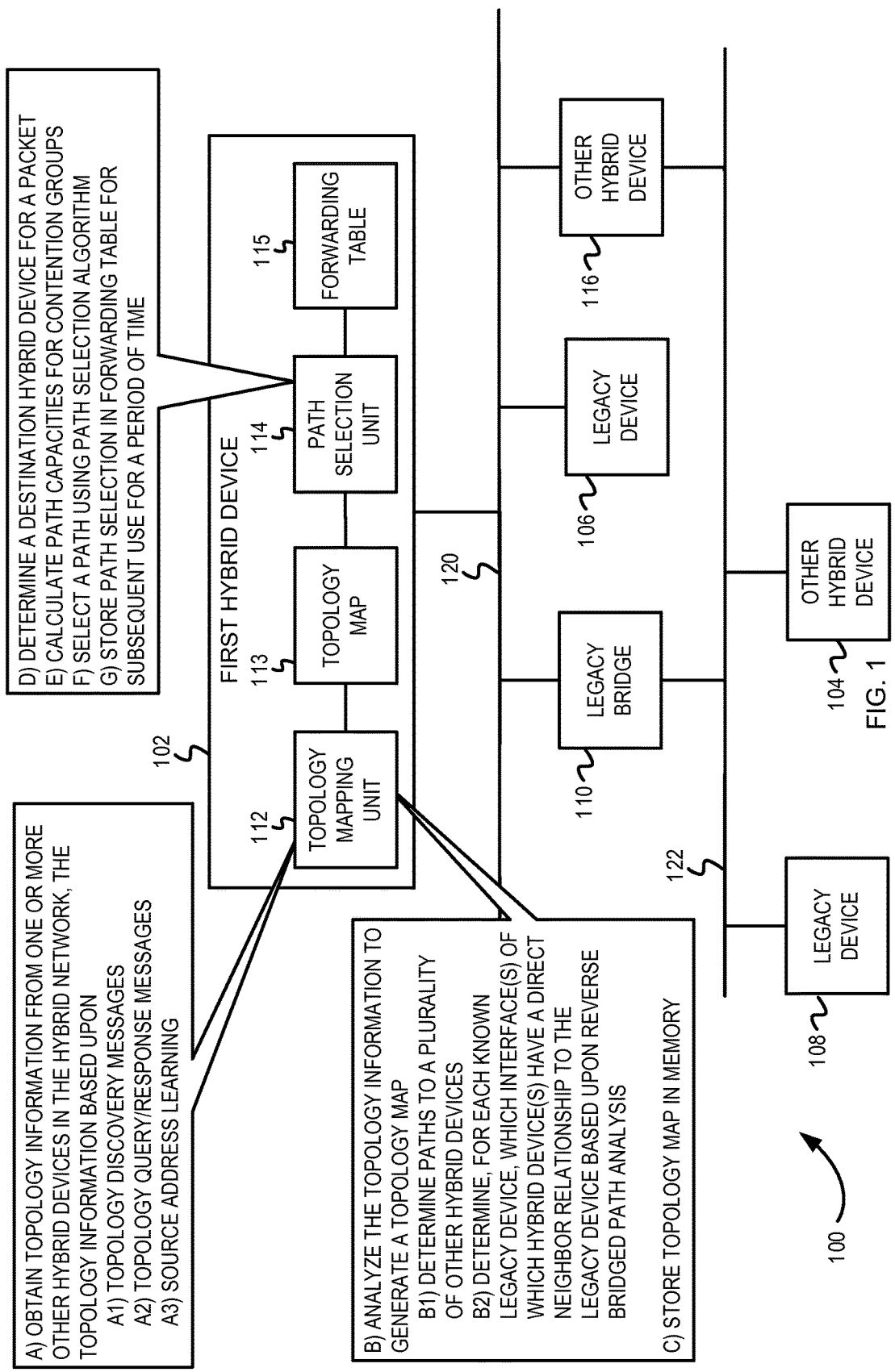
FIG. 1 is an example system diagram illustrating a process for topology mapping and path selection in a hybrid network.

The description that follows includes exemplary systems, methods, techniques, instruction sequences and computer program products that embody techniques of the present inventive subject matter. However, it is understood that the described embodiments may be practiced without these specific details. For instance, although in some embodiments the topology mapping and path selection algorithms are described for example hybrid networks that include wireless local area network (WLAN) devices (e.g., IEEE 802.11 devices), powerline network devices (e.g., HomePlug AV) and Ethernet devices, in other embodiments the topology mapping and path selection algorithms can be implemented in hybrid networks that include other suitable types of network devices that implement other standards/protocols (e.g., WiMAX, etc.). In other instances, well-known instruction instances, protocols, structures and techniques have not been shown in detail in order not to obfuscate the description.

In this disclosure, the network topology is determined based on topology information gathered and shared via a variety of processes. In various embodiments, topology information is gathered using a combination of broadcast topology messages, topology query and response messages, and source address learning. Legacy devices that are discovered by each hybrid device are included in a list of legacy devices in a topology protocol message. Once the topology information is gathered, a mechanism determines the locations of legacy devices as direct legacy neighbors with respect to one or more particular hybrid devices. The locations of legacy devices as direct legacy neighbors with respect to one or more particular hybrid devices may be determined by comparing the list of legacy devices associated with various interfaces of other hybrid devices. A pruning operation may be used to analyze the topology information and to determine where a particular legacy device is located as a direct neighbor in relation to the hybrid devices. A topology map may be generated to store paths to other hybrid devices and the locations of legacy devices in relation to interfaces of other hybrid devices, as will be further described below with reference to at least FIGS. 1-7.

In some embodiments, each hybrid device may independently select a "next hop" for a packet stream based upon a path selection mechanism. In this disclosure, a hop is defined as a communication from a first hybrid device to a second hybrid device via the same communication media and network segment without being bridged by a third hybrid device. Because hops described in this document refer to hops between hybrid devices, a hop may also be referred to as a hybrid hop interchangeably. Multiple hops may be involved in a communication from a first hybrid device to a second hybrid device that traverses different communication media, network segment, or via a third (relay) hybrid device. A next hop refers to a communication to the next hybrid device in a path, such as a current next hop in a path that is made up of a plurality of hops. In accordance with at least one embodiment of this disclosure, the path selection mechanism may also include calculating end-to-end path capacity for potential paths. The end-to-end path capacity may be based at least in part upon contention groups associated with shared media. Path groups may be created to bundle network paths prior to path selection. In one embodiment, a path group may include paths that are associated with a legacy bridge in the hybrid network. Contention groups, path groups, and various other concepts associated with the path selection mechanism will be further described below with reference to at least FIGS. 8-11. Selected paths may be recorded in a forwarding table for use with subsequent packets of a packet stream. The packet stream can be identified by stream identification information determined from the packets (such as a 5-tuple identifier based upon source address, destination address, source port, destination port, and protocol identifier).

Once a path is selected for a packet stream, subsequent packets for the packet stream follow the selected path. However, there may be conditions which would prompt a hybrid device to select a new path. A path selection update may occur, for example, in response to a change in network topology or a traffic loading condition (e.g. congestion or saturation of a link in the current path). Changes in link metrics (e.g. link capacity, medium utilization, buffer utilization rate, etc.) may prompt a path selection update at a hybrid device. Furthermore, because path selections are made independently at each hybrid device in the path from a source hybrid device to a destination hybrid device, a path selection update may be dependent upon path update procedures that are optimized for a hybrid network in which multiple hybrid devices may be utilized for a particular path. Path update mechanisms for various hybrid devices will be further described below with reference to at least FIGS. 12-14.

In some embodiments, a first hybrid device detects a network condition that prompts a path selection update. The network condition may be a topology change (such as a link failure at the first hybrid device, or a topology change notification from another hybrid device in the hybrid network). Alternatively, the network condition may be a change in link loading (such as congestion or saturation at a link in the current path, or a notification of changed link metrics reported by another hybrid device in the current path). In response to detecting the network condition, streams impacted by the network condition are identified. For example, impacted streams may be the streams that are associated with a path that includes a link that has failed. In one example, impacted streams are identified based upon protocol type (e.g. TCP or UDP) and a level of congestion or saturation associated with a link. Once streams are identified for path selection update, a new path is selected based upon an end-to-end path from the first hybrid device to the destination hybrid device. Load balancing, stream selection, and path update mechanisms, which will be further described below with reference to at least FIGS. 15-17, may be used to improve network conditions. A new path may be limited based on a maximum number of hops allowed for the packet stream through the hybrid network. Path selection update may also be dependent upon the type of traffic (e.g., TCP or UDP) and amount of congestion.

FIG. 1 is an illustration of an example hybrid network 100 to introduce various concepts associated with embodiments of the present disclosure. A hybrid network (such as a Convergent Digital Home Network (CDHN), or P1905.1 network) is typically formed by interconnecting communication networks (that support different communication protocols) across different network technologies and communication media. In this disclosure, a hybrid network may also be referred to as a hybrid communication network, a mixed communication network, or a hybrid home network. The hybrid network can include hybrid communication devices (referred to herein as "hybrid devices") that are often multi-interface and capable of operating across multiple networking technologies. A hybrid device (HD) may or may not have multiple interfaces but is considered a hybrid device if it is configured to use protocols associated with multi-interface devices in a hybrid network. The hybrid network can also include conventional, often single-interface, communication devices (referred to herein as "legacy devices") that are not configured to use hybrid device protocols.

In the example hybrid network 100, a first hybrid device 102 and other hybrid devices 104, 116 may have various network bridging capabilities. In some implementations, each hybrid device may support multiple interfaces using different networking technologies (i.e., Ethernet, IEEE 802.11, Coax, and powerline communications (PLC)). Furthermore, an interface that supports IEEE 802.11 may have different hardware capabilities (e.g., 2.4 GHz and/or 5 GHz support, dual band single radio, dual band dual concurrent, etc.). In this disclosure, WLAN may be used to refer to wireless local access network technology, including IEEE 802.11 and/or Wi-Fi™. It is noted that even though FIG. 1 does not explicitly show multiple communication interfaces for the hybrid devices 102 and 104 and 116, the hybrid devices 102, 104 and 116 can comprise two or more communication interface that couple the hybrid devices to two or more communication networks. IEEE P1905.1 draft standard defines an abstraction layer (AL) for multiple home network technologies that provides a common interface to several popular network technologies: IEEE 1901 over power lines, IEEE 802.11 for wireless, Ethernet over twisted pair cable and MoCA 1.1 over coax. In this disclosure, a HD is considered P1905.1 compliant if it includes the IEEE P1905.1 abstraction layer and associated protocols. The abstraction layer typically has a unique medium access control (MAC) address that is in addition to the interface layer (IL) MAC addresses associated with each interface of the HD. The P1905.1 protocol defines messages, such as the Topology Discovery Message, Topology Query/Response messages, or other messages communicated between hybrid devices to share information about the topology of the hybrid network.

The example hybrid network 100 includes legacy devices 106, 108, 110. Legacy device 110 is a specialized legacy device that includes bridging capability, and is therefore referred to as legacy bridge 110. A legacy device (LD) is a non-P1905.1 compatible device. In some embodiments (such as legacy devices 106, 108), a legacy device supports only a single networking technology at a given time and has one connection to the hybrid network. In other embodiments (such as legacy bridge 110), a legacy device may include multiple physical interfaces; but because the legacy device does not have the P1905.1 abstraction layer, each physical interface is considered an independent end point in the hybrid network. A legacy device is not a hybrid device for purposes of network topology and discovery. The legacy device typically gains access to the hybrid network through a hybrid device. A legacy device is considered a "direct legacy neighbor" (DLN) of a particular hybrid device if the particular hybrid device can communicate directly with the legacy device without going through another hybrid device. Specifically, a DLN is a legacy (i.e., non-P1905.1) device that has at least one connection to a HD without going through any other HD devices. Note that a legacy device may be DLN of multiple HDs.

In FIG. 1, the example hybrid network 100 includes two network segments 120 and 122. The network segment 120 is coupled with hybrid devices 102 and 116, and a legacy device 106. The network segment 122 is coupled with a hybrid device 104 and a legacy device 108. The legacy bridge 110 couples the network segment 120 and the network segment 122. It should be noted that hybrid device 116 includes at least two interfaces, one interface is coupled to network segment 120 and another interface is coupled to network segment 122. In other example networks, hybrid device 116 may include further interfaces, including more than one interface for a particular network technology. Legacy device 108 is a direct legacy neighbor to hybrid device 104, but not a direct legacy neighbor to the first hybrid device 102.

In a hybrid network, multiple end-to-end paths may exist between a pair of communicating devices, especially if a path traverses more than one hybrid device. For example, a path through the hybrid network may traverse multiple networking devices in tandem via different network technologies for each hop. In the example hybrid network 100, a communication path from first hybrid device 102 to legacy device 108 may utilize first network technology (e.g. Ethernet) on network segment 120 and a second network technology (e.g. PLC) on network segment 122. In one path, the first hybrid device 102 may use a two-hop path from first hybrid device 102 (as a source hybrid device) to hybrid device 116 (as a relay hybrid device), and from the hybrid device 116 to hybrid device 104 (as a destination hybrid device). Various examples of one-hop paths and two-hop paths are described in subsequent figures; however, it is noted that hybrid networks may include paths with three or more hops.

The selection of a path through the hybrid network is improved by having an accurate topology map of the hybrid network that includes both hybrid devices and legacy devices. Without an accurate topology map, a hybrid device may select a less efficient path for routing or forward packets in the hybrid network. A topology map that includes the relative locations of legacy devices and legacy bridges in the hybrid network allows for better path selection and path update algorithms. For example, the hybrid devices may implement protocols to improve network performance by evenly dividing the communication load over multiple paths. The presence of hybrid relays and legacy bridges of varying capability can influence the path selection decisions made by the hybrid devices, as will be further described below.

In the example hybrid network 100, each of the hybrid devices 102, 104, and 116 can broadcast topology protocol messages to advertise their presence in the hybrid network 100. For example, the hybrid device 102 can broadcast a topology discovery message (e.g., at predetermined periodic time intervals) comprising an identifier of the hybrid device 102 to announce its presence in the hybrid network 100 to the hybrid device 116. However, as described above, the legacy devices may not be capable of participating in the topology protocol (via topology protocol messages). Therefore, the hybrid devices 102, 104, and 116 can execute operations described below in stages A-C (and also FIGS. 1-7) to discover legacy devices in the hybrid network 100 in order to determine a topology map of the hybrid network 100.

The hybrid device 102 comprises a topology mapping unit 112, memory for storing a topology map 113, a path selection unit 114, and memory for storing a forwarding table 115. Likewise, although not depicted in FIG. 1, the hybrid devices 104 and 116 can also comprise their respective topology mapping units, memory, and path selection units. Also, although not depicted in every figure, it should be understood that the various hybrid devices may include one or more processing units and program instructions stored in memory, and the one or more processing units configured to execute the program instructions to implement, at least in part, the topology mapping and path selection and path update mechanisms described herein.

Once a complete topology map of the hybrid network is generated, a hybrid device should maintain, for each interface of the hybrid device, a list of connections to other hybrid devices and legacy devices located in the hybrid network. For each legacy device in the topology, the hybrid device may determine whether the legacy device is a direct legacy neighbor to the hybrid device or another hybrid device. Therefore, a topology map for a hybrid network is useful to determine the paths to both hybrid devices and legacy devices.

At stage A, the first hybrid device 102 gathers topology information from one or more other hybrid devices in the hybrid network. The topology information may be obtained using a variety of processes, such as those described in subsequent Figures. For example, at stage A1, topology discovery messages may be broadcast by each hybrid device (either periodically or in response to a detected change in topology). A topology discovery message from other hybrid device 116 is detected by the first hybrid device 102 to prompt the first hybrid device 102 to gather additional topology information. At stage A1, topology query/response messages may be exchanged between hybrid devices to request and receive additional topology information. For example, in response to the topology discovery message from other hybrid device 116 detected at first hybrid device 102, the first hybrid device 102 may send a topology query message to the hybrid device 116 to request information about further hybrid devices or legacy devices discovered by hybrid device 116. The hybrid device 116 may indicate in a topology response message (responsive to the topology query message) that it has discovered another hybrid device 104 via network segment 122. The first hybrid device 102 may then send a topology query message to the other hybrid device 104 to obtain further topology information.

Another way in which topology information may be obtained is through source address learning. As traffic is detected at an interface of a hybrid device, the hybrid device determines from the source address that the source of the traffic is a neighbor device. The hybrid device may attempt to communicate with the neighbor device to determine whether it is a legacy device or a hybrid device. Alternatively, the hybrid device may monitor for hybrid device protocol messages or inspect the physical layer protocol data unit (PDU) to determine whether the neighbor device is a hybrid device.

Once topology information has been gathered, at stage B, the first hybrid device 102 analyzes the topology information to generate a topology map. This may include, for example, stage B1 where the paths to a plurality of other hybrid devices are determined and added to the topology map. Stage B1 may include adding one-hop hybrid device first, then adding two-hop hybrid devices. In some implementations, a maximum number of hops (e.g. two-hops) may be used as a limit on the path distances in the topology map. At stage B2, the first hybrid device 102 may determine, for each known legacy device, which interface(s) of which hybrid device(s) have a direct neighbor relationship to the legacy device based upon reverse bridged path analysis. The determination of direct neighbor relationships and pruning of the legacy device list (including reverse bridged path analysis) is further described in FIG. 7. At stage C, the first hybrid device 102 may store the topology map 113 in memory.

Having generated a topology map, the first hybrid device 102 is capable of performing path selection or path reselection. Path selection, path reselection, and path update procedures may be performed by path selection unit 114. At stage D, the first hybrid device 102 determines a destination hybrid device for a packet. If the destination address is for a local direct legacy neighbor, then the first hybrid device is the destination hybrid device and the packet is forwarded to the local interface for delivery. However, if the destination address is for a direct legacy neighbor of another hybrid device, such as other hybrid device 104, then the first hybrid device 102 may perform path selection procedures, such as those described in FIGS. 8-11.

At stage E, the path selection unit 114 calculates path capacities for various paths. The path capacities are based on end-to-end path capacities from source hybrid device to destination hybrid device. Contention groups may be defined to more accurately calculate the end-to-end path capacities. Contention groups are used to analyze paths that traverse the same communication medium more than once. Contention groups are described in FIG. 9. The path selection unit 114 may also define available path groups (APGs) so that groups of paths may be compared as a set. Available path groups are used to analyze groups of paths which share a common legacy bridge. APGs are described in FIG. 10.

At stage F, a path is selected based on a path selection algorithm. An example path selection algorithm is described in FIG. 11. At stage G, the selected path may be stored in the forwarding table 115 for subsequent use. For example, once a path is selected for a particular packet stream, subsequent packets for the packet stream utilize the same path unless a network condition prompts a change. If a network condition prompts a change, a path update algorithm may be used, such as path update algorithms described in FIGS. 12-17.

Figure 2:
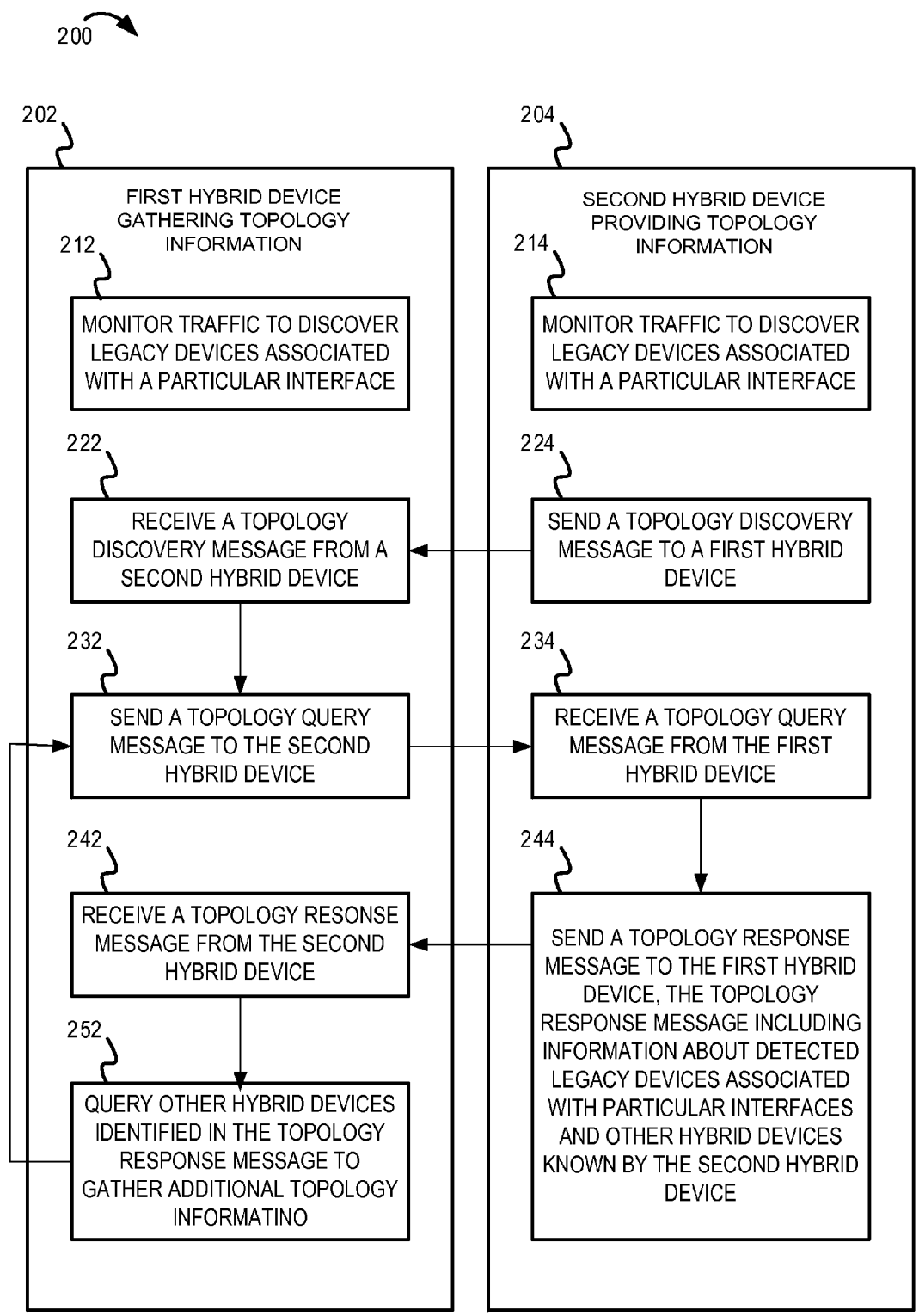
FIG. 2 is a diagram illustrating example operations for gathering topology information about hybrid devices and legacy devices in a hybrid network.

FIG. 2 is a diagram illustrating example operations 200 for gathering or providing topology information. In FIG. 2, a first hybrid device 202 is described as gathering topology information and a second hybrid device 204 is described as providing topology information. It should be understood that the devices are interchangeable and typically both hybrid devices would perform operations to gather and provide topology information. Several mechanisms for gathering topology are described below.

Source Address Learning.

At blocks 212 and 214, both devices monitor traffic to discover legacy devices associated with particular interfaces. As described in this disclosure, in some implementations, each hybrid device passively discovers legacy neighbors in relation to a particular interface based on monitoring the source address of transmissions received in the particular interface. As traffic is received at an interface, the hybrid device can build a list of legacy devices that may be reachable via that interface. Typically the list may include media access control (MAC) addresses for the devices that have sent packets through that interface. In some implementations, the MAC addresses for legacy devices are identified as a legacy device based on filtering the MAC addresses of known hybrid devices in the network. Additionally, the list of legacy devices for each interface may be communicated with other hybrid devices for use in determining the direct neighbor relationships, as described further below.

Topology Discovery Messages.

Blocks 222 and 224 are used to describe one form of topology protocol messages called topology discovery messages. In IEEE P1905.1 draft standard, topology discovery messages are periodically sent on each physical interface. The topology discovery messages are broadcast or multicast onto a network segment (e.g. media) and can be interpreted by a neighboring P1905.1-compliant device which has an underlying interface connected to the network segment. Topology discovery messages are not re-transmitted, so they are useful in determining direct neighbor hybrid devices. In this disclosure, such direct neighbor hybrid devices may be referred to one-hop neighbors. In this disclosure, a topology discovery message may also be modified to indicate the type of media the transmitting hybrid device is using to transmit the topology discovery message and the network association information (e.g., Basic Service Set Identifier (BSSID) of WLAN interface). If a receiving hybrid device receives a topology discovery message in a different type of media or different network segment than specified in the topology discovery message, then there may be a legacy bridging device between the transmitting hybrid device and the receiving hybrid device. A legacy bridging device may relay messages from one media type to another media type or from one network segment to another network segment but is not a P1905.1-compliant device. By determining the locations of the legacy bridging device, the resulting topology map can accommodate better path selection algorithms. In addition to topology discovery messages or alternatively, other direct messages (such as link layer discovery protocol (LLDP)) or broadcast neighbor messages (such as IS-IS) may be used to determine the locations of directly connected nodes that participate in the topology mapping protocol.

In the example operations of FIG. 2, at block 224 the second hybrid device 204 sends a topology discovery message via broadcast on one of the second hybrid device's interfaces. At block 222, the first hybrid device 202 receives the topology discovery message from the second hybrid device. Upon receiving the topology discovery message, the first hybrid device determines whether to update the topology map to add a one-hop path entry associated the local interface for the second hybrid device 204. In some implementations, the one-hop path entry is added if the following conditions are met:

the second hybrid device is newly discovered (e.g. has a unique AL MAC and IL MAC tuple); and the IL MAC of the received topology discovery message is associated with the same media type and same network segment as the local interface of the first hybrid device where the topology discovery message was received (for example, the IL MAC is associated with a same Ethernet network, PLC logical network, or same WLAN BSSID); and if the local interface of the first hybrid device where the topology discovery message was received is a WLAN STA interface, then a one-hop path entry may be added if the IL MAC of the received topology discovery message is associated with a WLAN AP interface of the second hybrid device. Otherwise, if the local interface of the first hybrid device where the topology discovery message was received is a WLAN STA interface and the IL MAC of the received topology discovery message is not associated with a WLAN AP interface of the second hybrid device, then a one-hop path entry may not be added. This condition may prevent one-hop entries for other WLAN STAs that may share the same WLAN AP as the first hybrid device.

Responsive to receiving the topology discovery message from the second hybrid device 204, the first hybrid device 202 then sends a topology query message at block 232 to request additional topology information from the second hybrid device 204.

Topology Query/Response Messages.

The IEEE P1905.1 specification defines Topology Query and Response messages which are unicast protocol messages exchanged between P1905.1-compliant hybrid devices. A topology query message is sent to a queried hybrid device to request information about the queried hybrid device's topology. As described in this disclosure, in some implementations, the topology response message is extended to include two lists of devices for each interface of the queried hybrid device: a first list includes identified hybrid device neighbors, and a second list includes identified legacy neighbors. Other information may be included in the topology response message, such as media type, link metric, bridging capability, or other information. The list of identified legacy neighbors can be based upon the source address learning performed by the reporting hybrid device. The list of identified hybrid device neighbors can be based upon the hybrid devices found by topology discovery messages. In an example implementation, the topology response message may only include one-hop hybrid device neighbors in the list of identified hybrid device neighbors.

At block 234, the second hybrid device 204 receives the topology query message and prepares a topology response message. The topology response message may include the following portions, including defined type-length-value (TLV) sections according to the topology protocol:

One Device Information Type TLV

Zero or more Device Bridging Capability TLVs

If a P1905.1 device has more than one interface, then the 1905.1 Control Entity may include at least one Device Bridging Capability TLV.

Zero or more Legacy Neighbor Device List TLVs

If a P1905.1 Control Entity has discovered Legacy Neighbor Devices, then it may include that device in the legacy Neighbor Device List TLV.

Zero or more P1905.1 Neighbor Device TLVs

If a P1905.1 Control Entity has discovered other P1905.1 Neighbor Devices, then it may include that device in the P1905.1 Neighbor Device TLV.

At block 244, the second hybrid device 204 sends the topology response message to the first hybrid device 202. At block 242, the first hybrid device 202 receives the topology response message. The first hybrid device 202 may then query other hybrid devices, such as those identified in the P1905.1 Neighbor Device TLV, at block 252.

Topology Notification Messages and Other Topology Information.

In addition to the methods described above to learn about other legacy and hybrid devices, other messages may be used to gather topology information. For example, Topology Notification Messages defined in IEEE P1905.1 draft standard may be used to indicate changes to the topology to neighboring or associated hybrid devices. Topology Notification Messages are similar to topology discovery messages, but they are relayed by each hybrid device to neighboring hybrid devices, and they contain more information regarding the originator of the topology notification messages. It should be understood that information from other protocols may also be used in gathering information about the existence or locations of various devices. For example, Link Metric Query/Response messages may be used to gather additional information about media type, link capacity, link utilization, etc.

Figure 3:
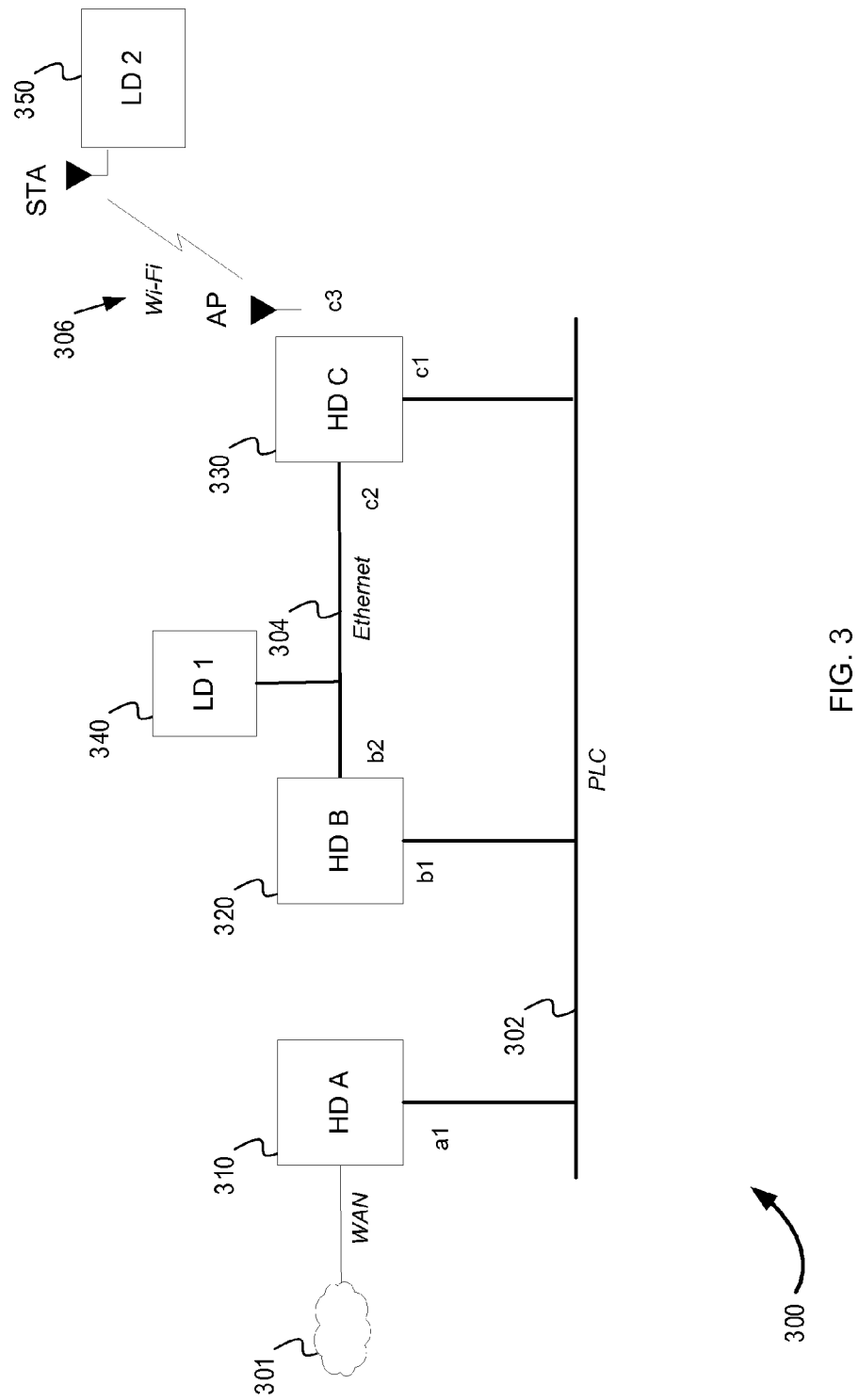
FIG. 3 is another example system diagram illustrating an example multi-hop hybrid topology in a hybrid network.

FIG. 3 is another example hybrid network 300 to illustrate various topology gathering algorithms. In FIG. 3, several hybrid devices (HD A 310, HD B 320, HD C 330) are coupled to a powerline communications (PLC) network 302. For example, hybrid device HD A 310 has a first interface A(a1) coupled to the PLC network 302. As a form of shorthand, when referring to a particular interface on a particular device the device is listed with a parenthetical to reflect the interface. Therefore, A(a1) refers to the PLC interface a1 on HD A 310. HD A 310 also has another interface to a wide area network 301. HD B 320 has an interface B(b1) coupled to the PLC network 302 and another interface B(b2) coupled to an Ethernet network 304. HD C 330 has an interface C(c1) coupled to the PLC network 302, another interface C(c2) coupled to the Ethernet network 304, and a further additional interface C(c3) which is a WLAN Access Point (AP) interface providing a WLAN coverage area 306. Two legacy devices are in the hybrid network 300. A first legacy device LD 340 is coupled to the Ethernet network 304. A second legacy device LD 350 is a WLAN Station (STA) interface communicatively connected to the WLAN AP interface C(c3).

Each HD gathers topology information regarding one-hop hybrid neighbors, two-hop hybrid neighbors, and legacy devices detected via various interfaces of each hybrid device. Using the example hybrid network 300 for FIG. 3, FIG. 4 shows an example of messages exchanged to gather topology information.

Figure 4:
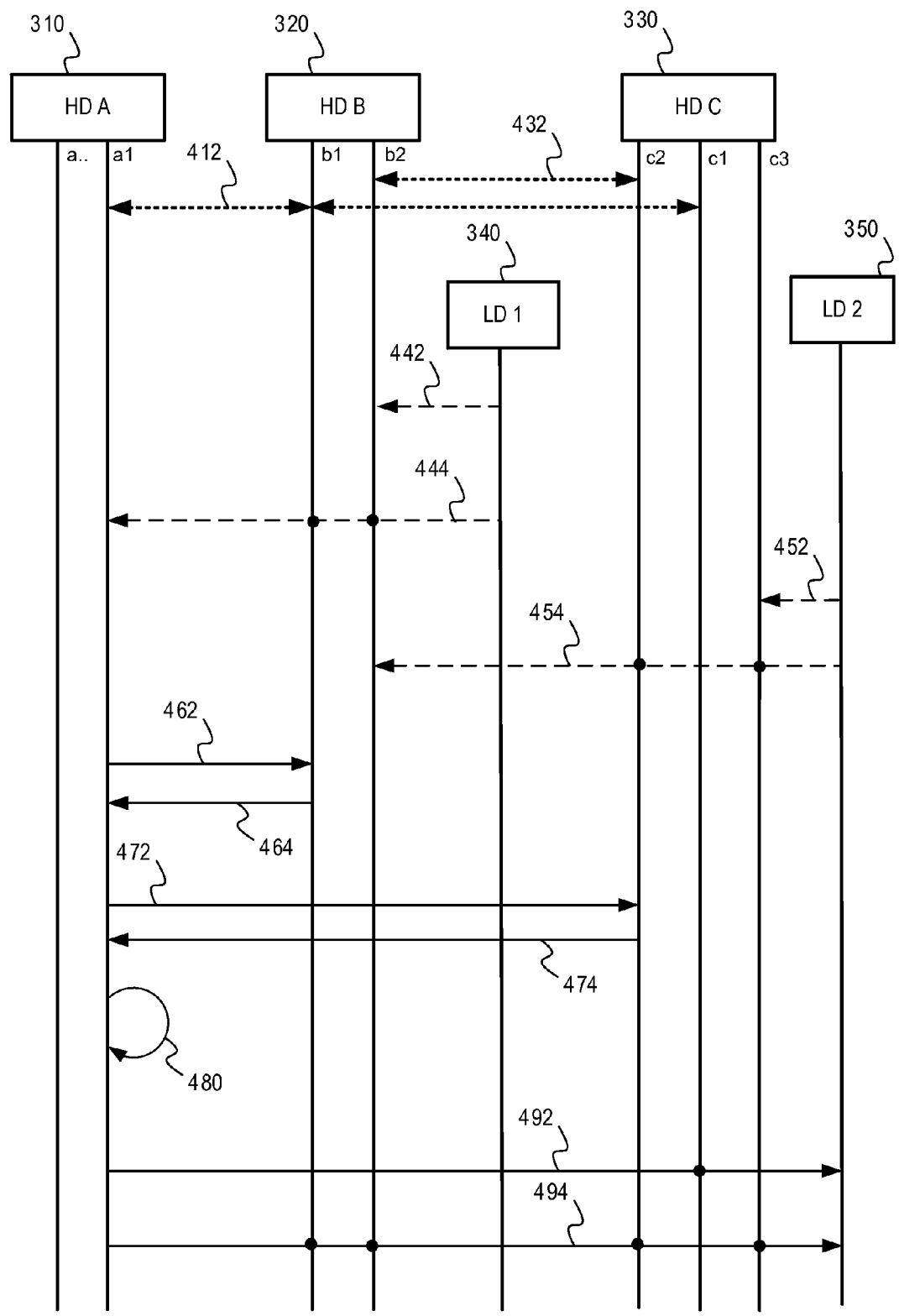
FIG. 4 is a message flow diagram illustrating example operations for gathering topology information and path selection in a hybrid network.

FIG. 4 is flow diagram illustrating example operations for gathering topology information and path selection in a hybrid network. At 412, each HD may broadcast topology discovery messages on the PLC network 302. For example, HD A 310 may broadcast a topology discovery message via interface A(a1) which would be detected by interfaces B(b1) and C(c1). Similarly HD B and HD C broadcast topology discovery messages via interfaces B(b1) and C(c1), respectively. In the interest of simplicity, processes to gather topology information will be described for HD A 310, but similar processes may take place at the other hybrid devices of the hybrid network. At 432, broadcasted topology discovery messages may be exchanged between interfaces B(b2) and C(c2). The topology discovery messages 412, 432 are useful in discovery one-hop hybrid neighbors for each interface.

In FIG. 4, the first legacy device 340 may send traffic to HD B 320 to obtain access to the WAN. Therefore, at 442 the HD B 320 may detect traffic from the first legacy device 340 via interface B(b2). Similarly, as traffic is bridged by HD B 320 from interface B(b2) to B(b1) and forwarded to interface A(a1) of HD A 310, the HD A 310 may also detect the legacy device 340 as a neighbor of interface A(a1). As shown in subsequent Figures, when generating a topology map, if there are two or more hybrid device interfaces that detect traffic for the same legacy device, a pruning algorithm is performed to determine which interfaces have a direct legacy neighbor (DLN) relationship with the legacy device. For example, in FIGS. 3 and 4, it is possible that both A(a1) and B(b2) may detect ingress traffic for the first legacy device 340. However, A(a1) is a downstream interface for traffic originating from the first legacy device 340 and bridged by the HD B 320. Upon analyzing the topology information, the hybrid device A 310 will determine that legacy device 340 is not a DLN of A(a1) and is instead a DLN of B(b2).

In FIG. 4, the second legacy device 350 may send traffic to HD B 320 via a bridged path from C(c3) bridged to C(c2) and forwarded to B(b2). A shorthand for this path might be LD2++C(c3)*C*C(c2)++B(b2) where "++" is used to indicate a hop in the path and "*" is used to indicate bridging by a device. In this example, both B(b2) and C(c3) will detect ingress traffic for the second legacy device 350 and include the second legacy device 350 in a list of legacy neighbor devices for those interfaces.

Topology query/response messages are depicted at arrows 462/464 and 472/474. In response to receiving the topology discovery message 412 from B(b1), the HD A 310 may send a topology query message 462 to HD B 320. Typically the topology query message is addressed to the AL MAC of the queried HD, and the topology response message includes information about all interfaces of the queried device. In this disclosure, the topology query message 464 also includes information about detected legacy devices LD1 340 and LD2 350 that were detected via ingress packets at interface B(b2). Similarly, the HD A 310 may also query (at arrow 472) the HD C 330 and receive a response (at arrow 474) that indicates that LD2 350 was detected via ingress packets at interface C(c3) of HD C 330.

At 480, the HD A 310 processes the gathered topology information. Any newly discovered remote interfaces for one-hop hybrid neighbors and two-hop hybrid neighbors are added to the topology map as well as information about the type of media for each interface and bridging capabilities associated with the interfaces. The list of legacy neighbor devices for each interface in the topology map is analyzed to remove entries of legacy neighbor devices that are not direct legacy neighbors for the interface. At this point, HD A 310 would determine that LD1 340 is not a DLN of interface A(a1) but it is a DLN of interface B(b2). HD A 310 would also determine that LD2 350 is not a DLN of interface B(b2) but it is a DLN of interface C(c3).

As an example of one-hop and two-hop paths, consider a path selection for a packet stream from HD A 310 to a destination address associated with LD2 350. First the HD A 310 determines that HD C 330 is the destination hybrid device that has LD2 350 as a direct legacy neighbor. Then the HD A 310 checks the topology map to identify potential paths to HD C 330. A one-hop path (shown as arrow 492) exists via the path A(a1)++C(c1). A two-hop path (shown as arrow 494) exists via the bridging capability of HD B 320. The two-hop path may be denoted as A(a1)++B(b1)*B*B(b2)++C(c2).

Figure 5:
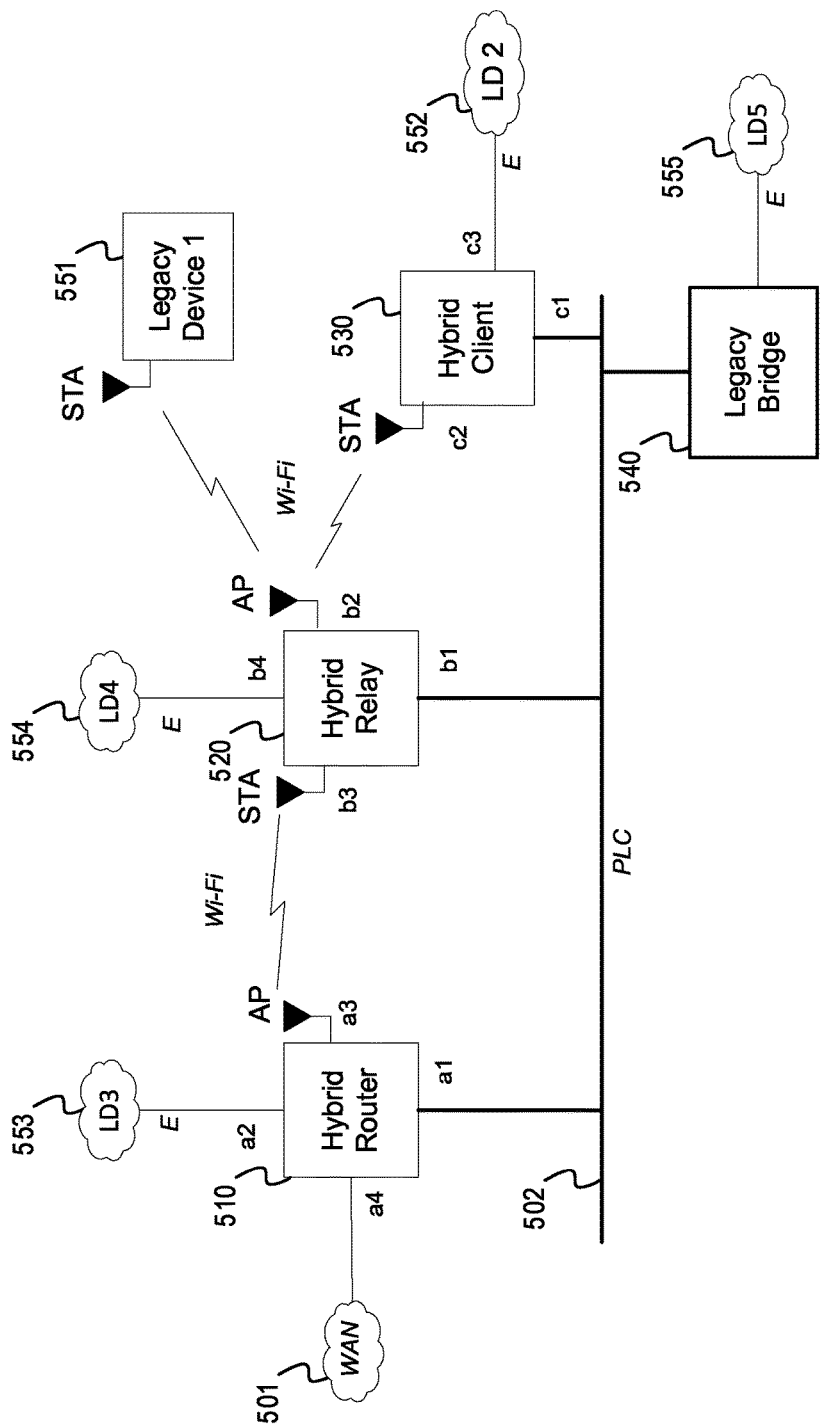
FIG. 5 is an example system diagram illustrating an example multi-hop hybrid topology in a hybrid network.

FIG. 5 is another example hybrid network 500 showing a slightly more complex arrangement to illustrate topology mapping. In FIG. 5, the hybrid network 500 includes a hybrid router (A) 510, a hybrid relay (B) 520, a hybrid client (C) 530, a legacy bridge 540, and legacy devices 551, 552, 553, 554, 555. Hybrid router 510 is coupled via interface A(a4) to a WAN 501. Hybrid router 510 also has an interface A(a1) coupled to a PLC network 502, an interface A(a2) coupled to an Ethernet network, and an interface A(a3) that is a WLAN AP interface. Hybrid relay 520 has an interface B(b1) coupled to the PLC network 502, an interface B(b3) that is a WLAN STA interface connected to WLAN AP interface A(a3), an interface B(b4) coupled to an Ethernet interface, and an interface B(b2) that is a WLAN AP interface. The hybrid relay 520 is a relay hybrid device. A relay hybrid device may also be referred to as a hybrid range extender (HRE), especially where, as in this example, the relay hybrid device includes both a WLAN STA interface and a WLAN AP interface.

Hybrid client 530 has an interface C(c1) coupled to the PLC network 502, an interface C(c2) that is a WLAN STA interface connected to WLAN AP interface B(b2), and an interface C(c3) coupled to an Ethernet network. As a result of topology mapping, hybrid router 510 would learn of the following example paths to hybrid relay 520 (noted as "B") and hybrid client 530 (noted as "C"):

Via A(a1):
   one-hop path to B {A(a1)++B(b1)}
   two-hop path to B {A(a1)++C(c1)*C*C(c1)++B(b1)}
   two-hop path to B {A(a1)++C(c1)*C*C(c2)++B(b2)}
   one-hop path to C {A(a1)++C(c1)}
   two-hop path to C {A(a1)++B(b1)*B*B(b2)++C(c2)}
   two-hop path to C {A(a1)++B(b1)*B*B(b1)++C(c1)}
Via A(a3):
   one-hop path to B {A(a3)++B(b3)}
   two-hop path to C {A(a3)++B(b3)*B*B(b2)++C(c2)}
   two-hop path to C {A(a3)++B(b3)*B*B(b1)++C(c1)}

In addition to the paths identified, the hybrid router 510 may also gather and store information about link capacities, media type, and utilization associated with each local its local interfaces and each remote interface of hybrid relay 520 and hybrid client 530. This information may be stored with the topology map or in other storage medium. As shown in subsequent figures, path capacities may be calculated using the paths in the topology map and the link/interface information.

As show in FIG. 5, there may be several legacy devices in the hybrid network. In addition to the interfaces where each legacy device is shown on the example hybrid network 500, as packet data is communicated through the hybrid network, ingress traffic for the legacy devices may be detected at several other hybrid device interfaces. In generating the topology map, a hybrid device may analyze the topology information to determine where each legacy device is a direct legacy neighbor to a particular interface.

Figure 6:
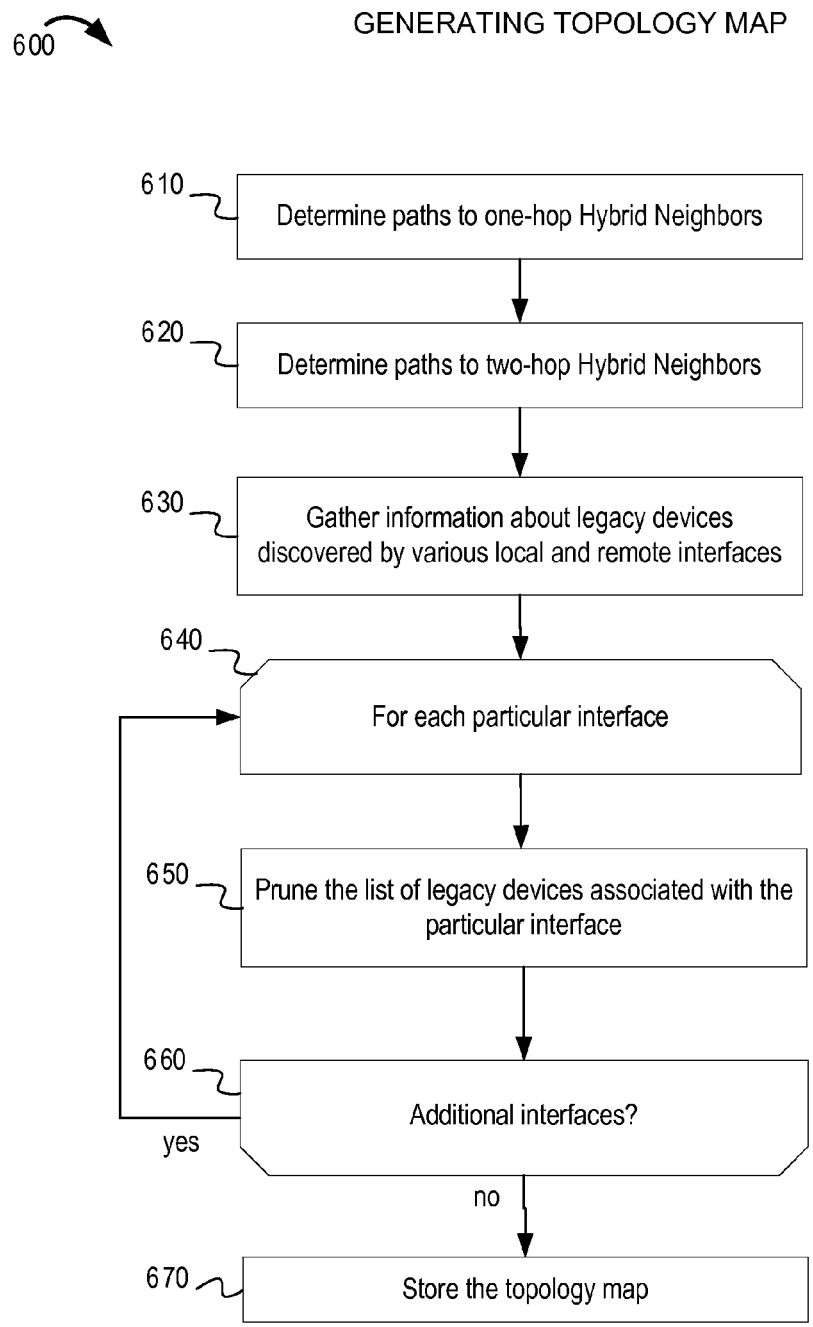
FIG. 6 is a flow diagram illustrating example operations for generating a topology map in a hybrid network.

FIG. 6 is a flow diagram illustrating example operations 600 for generating a topology map in a hybrid network. Once the topology information is gathered, an algorithm determines the locations of legacy devices as direct legacy neighbors with respect to one or more particular hybrid devices. As a result of the topology mapping algorithm, a list of available path entries to other HDs will be generated for each interface of the HD. The topology mapping algorithm will also be used to determine a list of direct legacy neighbors for each interface of known HDs in the hybrid network. It should be understood that formats and structure of the topology map are only examples, and the information may be represented as lists, tables, databases or other structures. While described as two separate lists, it should be apparent that the information may be stored in a combined list having flags or fields to indicate a particular device as a hybrid device or a legacy device.

At block 610, paths to one-hop HD neighbors are determined. From the Topology Discovery messages, or any other broadcast messages that are not re-transmitted, a hybrid device can determine direct neighbor HD device, which may be referred to as one-hop HD neighbors. Upon receiving a topology discovery message on a local interface, a HD will record an entry in the topology map if topology mapping criteria is met. For example, the topology mapping criteria may check the Topology Discovery Message to verify that the abstraction layer MAC and interface layer MAC tuple are new to the receiving HC. Furthermore, if the Topology Discovery Message indicates the media type which was used for transmission, the receiving HD may verify that it was received on an interface having the same media type. If the media types are different, then a legacy bridging device may be in the path between the sender and receiver, and the sender is not considered a one-hop neighbor. Furthermore, if the interface which received the Topology Discovery Message is an endpoint client interface (such as a WLAN STA) then the Topology Discovery Message may only be processed if the interface layer (IL) MAC is the same as the WLAN BSSID that provides access point services to the WLAN STA interface. In other words, in some implementations, if the interface is a WLAN endpoint, then only Topology Discovery Messages from the WLAN Access Point are processed (and not Topology Discovery Messages from other WLAN STA devices). It should be noted that each interface of the HD maintains a separate list of one-hop HD neighbors determined based upon the Topology Discovery Messages.

At block 620, paths to other HD neighbors (e.g. two-hop HD neighbors) are determined. Once the one-hop neighbors are determined on each of the local interface, the HD determines connectivity to other HD devices in the network beyond one hop using Topology Query messages, and processing information received in the Topology Response messages. Per P1905.1 specification, each P1905.1 compliant HD will report its direct one-hop neighbors on each of its underlying interface in the Topology Response message upon request. A Topology Query message may be sent if a new HD device is detected or if a topology notification message is received on a local interface. As the topology map is being constructed a first HD device will query one-hop neighbors to gather more information about further devices. A one-hop neighbor responds with its list of one-hop neighbors, some of which may be two-hop neighbors from the local interface of the querying HD. Note that a HD may be a one-hop neighbor from a first interface of the querying HD and a two-hop neighbor from a second interface of the querying HD.

The Topology Response message will list the one-hop HD neighbors known by the queried HD. The querying HD will process the received Topology Response message to determine new two-hop neighbors on the local interface to include in the topology map. In some cases, it may be necessary to query the new two-hop devices to determine more information about the path between the one-hop neighbor and the two-hop neighbor. In constructing the path between the querying HD, the one-hop HD, and the two-hop HD, the topology map includes information about each interface in the path. For example, an entry in the topology map may include information such as "HD A interface a1 is connected to interface b1 of HD B, HD B can bridge traffic from interface b1 to HD B interface b2 which is connected to interface c2 of HD C" (or in shorthand version: "A(a1)++B(b1)*B*B(b2)++C(c2)"). Note that the example includes bridging by hybrid device B between two interfaces b1 and b2, where b1 and b2 can be different physical interfaces (e.g., WLAN and PLC) or same physical interface but operating on different network segments (e.g., WLAN relay) or the same physical interface operating on the same network segment (e.g., WLAN AP).

At block 630, topology information is gathered to learn about legacy devices discovered at various local and remote interfaces. Each device performs Source Address Learning, as described above, to determine which interface has a path to a legacy device. In particularly, each HD can monitor traffic to determine which interface has received a packet from a legacy device most recently. The list of legacy devices may be based on a subset of monitored traffic after removing source addresses that are associated with hybrid devices. The list of legacy devices (and associated interfaces) detected by each hybrid device is communicated in a Topology response message. For example, the Topology Response Message may include a per-interface Legacy Neighbor Device List listing detected legacy devices associated with the interface of the reporting HD.

However, the Legacy Neighbor Device List is based upon source address learning, and may include direct legacy neighbors in addition to legacy devices that are not direct neighbors. Therefore, introduced are algorithms to determine direct legacy neighbor relationships for various interfaces of hybrid devices in the topology map. A Direct Legacy Neighbor (DLN) of a HD connects to the HD without going through any other HD. A hybrid device maintains a list of legacy devices it has discovered through source address learning, as well as legacy devices reported by other hybrid devices in the topology map. The listing includes information about particular interfaces of each HD where the legacy devices have been detected. Either periodically, or in response to a detected change, the hybrid device analyzes (e.g. "prunes") the list to determine the locations of direct legacy neighbors. A timer may be used to postpone pruning operations to prevent analysis of transient states, such as when a new legacy device joins the network and may be reset following an update.

At blocks 640, 650, 660, pruning is done on a per device per interface basis. For example, after collecting the topology map and information about legacy devices at each interface of each hybrid device in the topology map, the hybrid device will analyze the collected information starting with legacy devices listed for a first interface of the hybrid device, at block 640. At block 650, the legacy device list associated with the first interface is pruned (each legacy device is analyzed and pruned off the list if it is not a DLN of the first interface). During pruning the hybrid device determines whether two or more hybrid devices have detected traffic for a particular legacy device, and then determines which hybrid device(s) is a direct legacy neighbor for the particular legacy device. It is noted that sometimes two or more hybrid devices may be a DLN to the legacy device, such as when there is a broadcast media network between the legacy device and more than one hybrid device. The goal of pruning is to remove paths to a particular legacy device where the path includes a second hybrid device. The pruning is repeated for each interface until the hybrid device has checked the legacy device list for all known interfaces at block 660. At block 670, the hybrid device stores the topology map in memory for use during path selection or path reselection.

Figure 7:
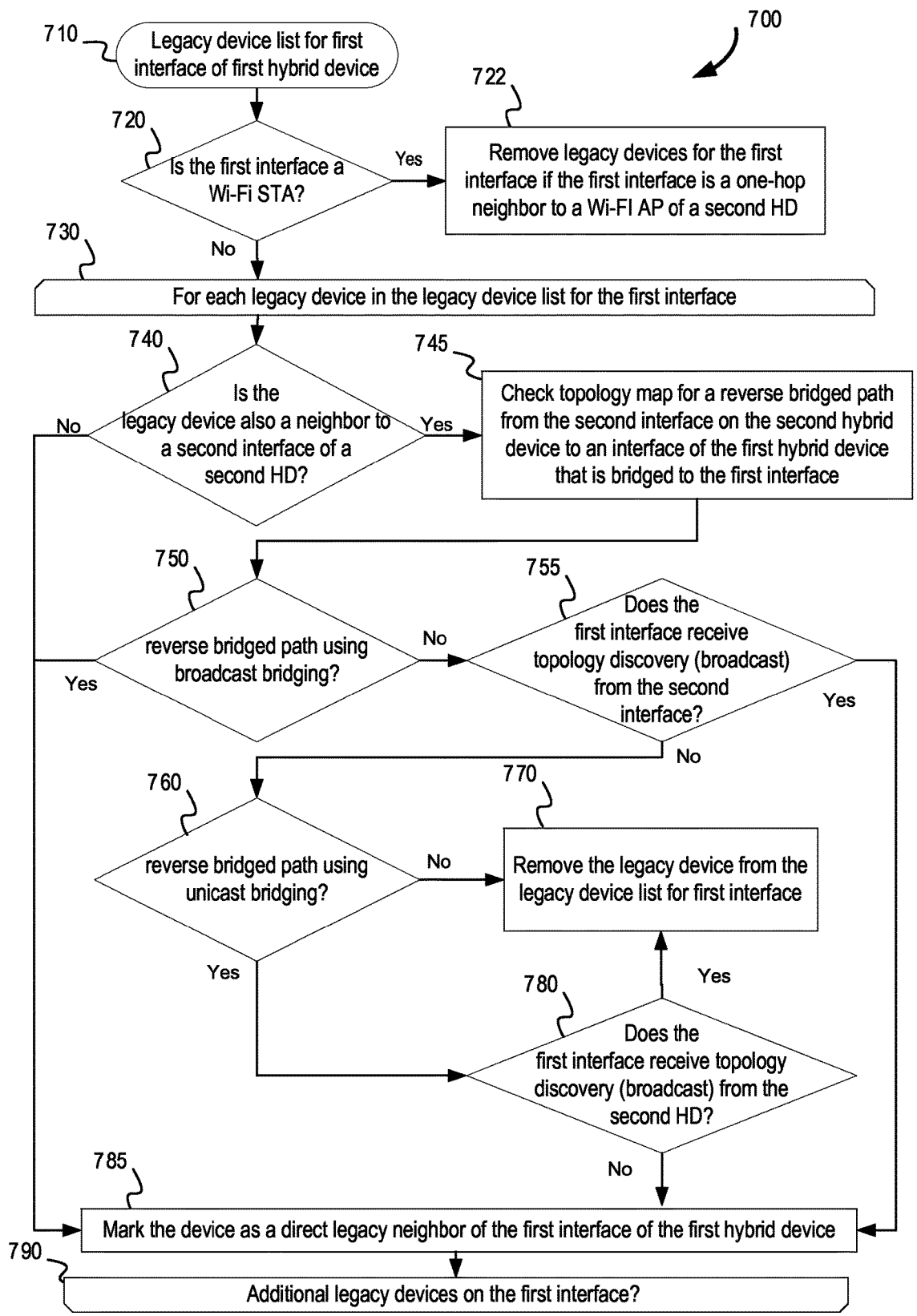
FIG. 7 is a flow diagram illustrating example operations for pruning a topology map and discovering direct legacy neighbor locations in a hybrid network.

FIG. 7 is a flow diagram illustrating example operations 700 for pruning a topology map and discovering direct legacy neighbor locations. Provided is an example of pruning rules. It should be understood that the operations are examples and that other rules for determining direct legacy neighbor relationships or pruning the topology map may be conceived. Starting at 710, a given legacy device list associated with a first interface A(a1) (the interface a1 on hybrid device A) is pruned. The same operations can be performed iteratively for other interfaces (such as A(a2), A(a3), B(b1), B(b2), B(b3) . . . of FIG. 5). A hybrid device (such as hybrid router 510) may iteratively perform this process analyzing the legacy device list for each interface, including the remote interfaces of other HDs for which the first hybrid device has a path. In some implementations, the pruning is performed as follows:

At 720, the hybrid device checks if A(a1) is WLAN STA interface. If it is a WLAN interface, then the hybrid device checks if a one-hop neighbor of A(a1) is the WLAN AP interface of another HD. At block 722, if the interface A(a1) is a WLAN STA interface and is a one-hop neighbor to a WLAN AP interface of another HD in the topology map, then the hybrid device removes all legacy devices on the list for the interface A(a1). None of the legacy devices can be a DLN of A(a1) since they would also have to "hop" through the WLAN AP interface before reaching the WLAN STA interface A(a1).

Next, starting at block 730, each legacy device L in the legacy device list for interface A(a1) is analyzed between loop 730 to 790. There are at least two scenarios for a legacy device L to be reported in the legacy device lists of two or more hybrid devices. In a first scenario, the legacy device is connected (directly or via a legacy bridge) to both hybrid devices on a shared medium. In a second scenario, the hybrid devices are both along the path of the traffic stream from the legacy device to a destination device. In the second case, the legacy device is the DLN of the closest upstream hybrid device. Therefore, to detect for the second scenario (and remove the legacy device as a DLN of a downstream hybrid devices), a traceback check may be performed. At 740, if there exists another interface B(b1) (the interface b1 on hybrid device B) that reports legacy device L as legacy neighbor, then a traceback check (e.g. a traceback calculation) may be performed at 745 to determine which device is closest to the legacy device L.

Before reviewing the flowchart blocks 745-785, the traceback calculation will be described with an example algorithm. In one example, the traceback check is used to determine if there is a reverse bridged path leaving HD B from interface b1 and reaching HD A on an interface A(a2) that can be bridged by HD A to A(a1). In this disclosure, a reverse bridged path from B(b1) to A(a1) is a path leaving HD B from interface b1 and reaching HD A on an interface A(a2) that can be bridged by HD A to A(a1). If there is no reverse bridged path, then a packet from legacy device would not reach A(a1) before reaching B(b1)—which means that A(a1) is not closer to the legacy device than B(b1). This is another way to determine which device is the closest upstream hybrid device to the legacy device.

The legacy device L on the list is not a DLN of A(a1) if:
There is no reverse bridged path from B(b1) to A(a1) for broadcast, and A(a1) cannot receive topology discovery (broadcast) from B(b1); and
There is no reverse bridged path from B(b1) to A(a1) for unicast, or A(a1) receives topology discovery (broadcast) from a different interface of HD B (not B(b1)). Note: this second situation assumes unicast packets from a legacy device on shared medium, such as PLC or Ethernet, should go directly to the downstream HD B without being bridged at A(a1).
Otherwise, mark the topology map to indicate that legacy device L is DLN of A(a1).

To better understand the traceback check associated with a reverse bridged path, consider the two possibilities, where a legacy device L communicates with a destination device (dest). In both these scenarios, both A(a1) and B(b1) may detect ingress packets from legacy device L:
Example scenario 1: L++A(a1)*A*A(a2)++B(b1)*B*B(b2)++dest
Example scenario 2: L++B(b1)*B*B(b2)++A(a1)*A*A(a2)++dest In example scenario 1, legacy device L is a DLN of A(a1) and is not a DLN for B(b1). In example scenario 2, legacy device L is a DLN of B(b1) and is not a DLN for A(a1). To determine which scenario is reality, the traceback check analyzes the topology map to see if there is a reverse bridged path from B(b1) to another interface A(a2) of HD A, where HD A performs bridging from A(a2) to A(a1). In scenario 1, B(b1) can communicate with HD A via A(a2) and device A performs bridging from A(a2) to A(a1). Therefore, it is likely (but not conclusive) that legacy device L is a DLN of A(a1). In scenario 2, however, B(b1) cannot communicate to HD A without being bridged by HD B via B(b2). Therefore, in scenario 2 it can be said that there is no reverse bridged path from B(b1) to another interface of HD A that is bridged to A(a1).

It should be noted that in some example scenarios the interface A(a1) may be configured to bridge ingress traffic as egress traffic on the same interface A(a1) (such as a PLC or WLAN AP interface). In the traceback check, if there is a reverse bridged path from B(b1) to A(a1) and A(a1) is configured to bridge traffic on the same interface A(a1), then it is possible that the legacy device L is a DLN to both A(a1) and B(b1). In that example scenario, the legacy device L may not be removed as a DLN for interface A(a1). When processing the legacy neighbor list for interface B(b1), the traceback check will be from the perspective of B(b1) and the legacy device L may or may not be removed as a DLN of B(b1).

The traceback calculation involves inspecting the topology map. In some example implementations, a depth-first-search iterative algorithm may be used to determine whether other hybrid devices may provide bridging between A(a1) and B(b1). Since both A(a1) and B(b1) have detected traffic from the legacy device L, it is possible that one of the interfaces is downstream in a path from legacy device L to another destination. Consider, for example, a path to a legacy device L such as L++B(b1)*B*B(b2)++A(a1)*A*A(a2)++dest. Both A(a1) and B(b1) may detect traffic from legacy device L destined for another device that is a downstream destination (dest). However, since there is no reverse bridged path from B(b1) to A(a1) then the traceback check indicates that the legacy device L is not a DLN of interface A(a1).

By performing the pruning (and traceback checks), legacy devices may be removed from the list associated with particular interfaces of hybrid devices in the network, and would remain on the list associated with other interfaces of hybrid devices in the network. Therefore, the legacy devices will be listed as direct legacy neighbors to the interfaces of hybrid devices that have direct paths to the legacy device.

Returning to FIG. 7, the traceback check is described in more detail. At 745, the hybrid device checks the topology map for a reverse bridged path from the second interface on the second hybrid device to the first interface of the first hybrid device. At 745, the hybrid device checks the topology map for a reverse bridged path from the second interface on the second hybrid device to an interface of the first hybrid device that is bridged to the first interface. The reverse bridged path analysis is done separately for broadcast and unicast and any reverse bridged paths are recorded for subsequent steps. At 750, if there is no reverse bridged path using broadcast bridging, then the hybrid device checks, at 755, if the first interface can receive topology discovery (broadcast) from the second interface. If the first interface cannot receive topology discovery (broadcast), then the flow continues to 760.

At 760, if there is no reverse bridged path using unicast bridging at the second hybrid device, then the legacy device is removed from the legacy device list for the first interface at 770.

If a reverse bridged path is found at 760, there may be other rules to govern which hybrid device is used as a direct legacy neighbor for the legacy device. For example, at 780 if the first interface can receive topology discovery (broadcast) from the second device (other than the second interface), then the legacy device is removed from the list of legacy devices for the first interface at 770.

At 785, if no second interface of a second hybrid device has discovered the legacy device, or if the pruning algorithm has not removed the legacy device from the legacy device list for the first interface, then the hybrid device may mark the device as a direct legacy neighbor of the first interface. At 790, the process repeats for further legacy devices in the legacy device list for the first interface until all legacy devices in the legacy device list has been analyzed.

Figure 8:
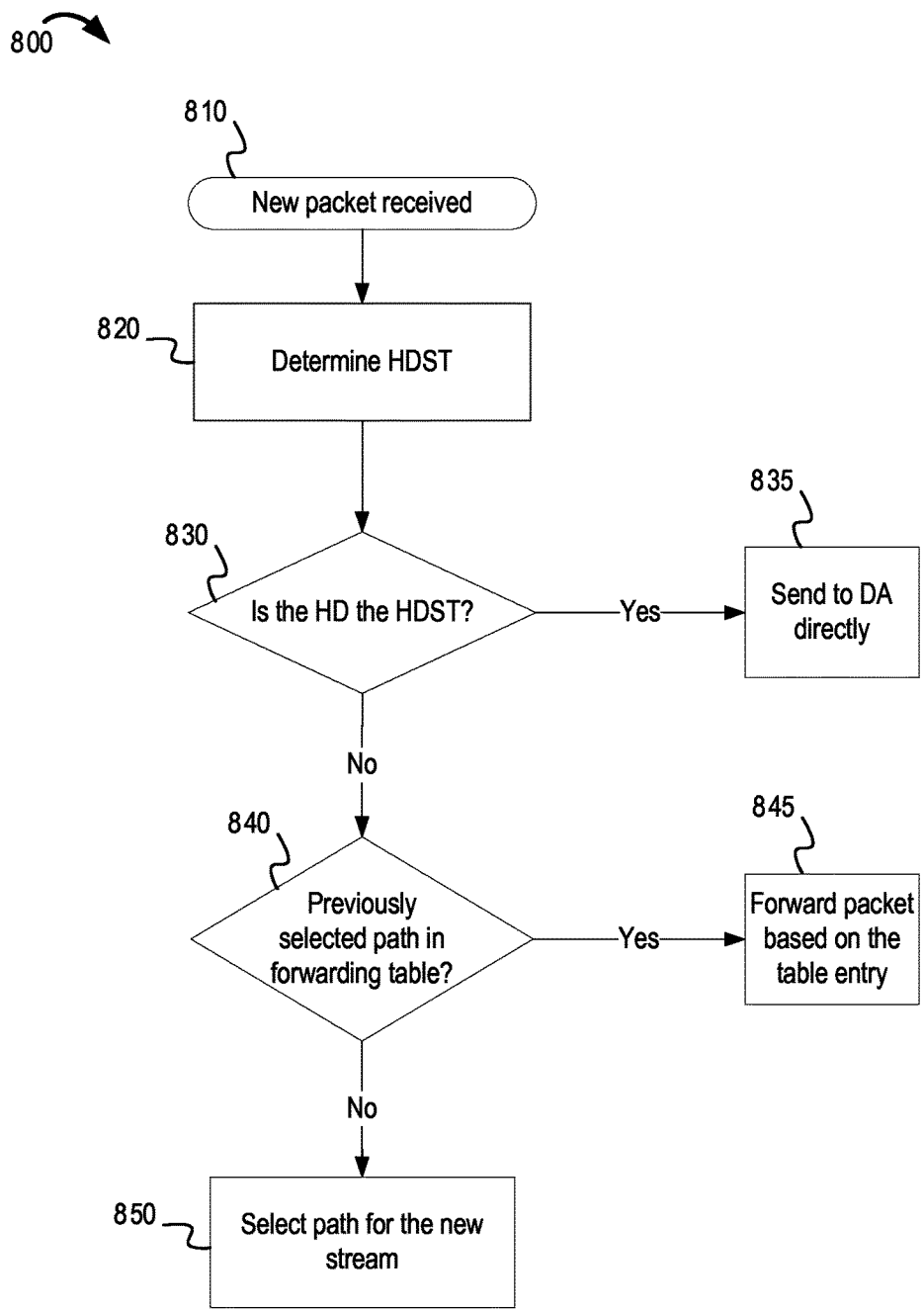
FIG. 8 is a flow diagram illustrating example operations for packet processing in a hybrid network.

FIG. 8 is a flow diagram illustrating example operations 800 for packet processing in a hybrid network. At 810, a hybrid device receives an ingress packet. At 820, the hybrid device inspects the packet to determine a destination hybrid device closest to the destination address of the packet. For example, for a destination address associated with a legacy device, the hybrid device determines which hybrid device in the topology map has a direct legacy neighbor relationship with the destination legacy device. At 830, if the hybrid device that received the ingress packet is the destination hybrid device (either a packet addressed to the hybrid device itself or to a legacy device that is a direct legacy neighbor of the hybrid device), then at 835, the hybrid device processes the packet by sending it to the destination address directly.

If the hybrid device is not the destination hybrid device, then the packet may be forwarded to a remote destination hybrid device. At 840, the hybrid device checks a forwarding table to see if there is a previously selected path in the forwarding table for the destination hybrid device. For example, if the forwarding table contains an entry with the stream identification information (e.g. 5-tuple of source address, destination address, source port, destination port, and protocol) then, at 845, the packet is forwarded according to the path information associated with the entry. If the forwarding table does not have an entry for the stream identification information, then at 850 a new path is selected. The packet may be associated with a new stream. A path selection process is used by the hybrid device to select the next hop based on an end-to-end path capacity.

Path selection refers to a decision by each hybrid device, independently, regarding the next hop (also referred to as a "forwarding decision" or "route") for a packet to a destination. Once a path is selected for a particular application stream, the hybrid device may continue to utilize the selected path (e.g. forwarding decision to next hop) until detecting a network condition change, such as a topology change or a link metric change. Path reselection may also be performed for load balancing either periodically or in response to a network condition change. Each incoming packet includes stream identification information (e.g. source address, destination address, port address, protocol) which allows a hybrid device to identify the incoming packet as belonging to an existing stream which already has a selected path or to a new stream which requires a new path selection. The hybrid device maintains a forwarding table with path selection information about each existing stream. The forwarding table may include the stream identification information, information about the path selected (also referred to as forwarding decision information), and may store other information regarding the stream (e.g. stream data rate, prioritization information, stream medium utilization, etc.). Path selections in the forwarding table may be removed if a predetermined time period elapses without receiving an incoming packet for a particular stream.

Path selection can be made on a per stream basis by each hybrid device. Therefore, a hybrid device may not instruct path decisions downstream. For example, a first hybrid device receives an incoming packet and makes a forwarding decision based upon end-to-end path characteristics about the path from the first hybrid device to the destination device. If there is a second hybrid device in the path, then when the second hybrid device receives the incoming packet, the second hybrid device may independently make a path selection about the next hop from the second hybrid device to the destination device. While path selections may not be coordinated between the first and second hybrid devices, the hybrid devices may make forwarding decisions based upon known hybrid network paths and path characteristics. In other words, each hybrid device may utilize end-to-end path characteristics as described herein to make similar path selections.

Before path selections are performed, a hybrid network may determine hybrid network paths to each destination device based upon a topology map of the hybrid network.

The topology map can be used for determining the forwarding role that a particular hybrid device will use for a packet in a new stream. The topology map may be useful in gathering link metrics for each available path and determining end-to-end path metrics that take into account contention-based networks in the path. In addition, locations of legacy bridging devices may be discovered and recorded in the topology map. During path selection, an end-to-end path metric may be grouped with other paths that utilize the same legacy bridging device since the route taken by the legacy bridging device may be unpredictable. Therefore, path selection described in this disclosure can accommodate a variety of hybrid network topologies and end-to-end path characteristics. Features of path selection are described in more detail in FIGS. 9-11.

Topology map listings may also be used to store bridging capabilities of the hybrid devices, and link metric information about the links between hybrid devices. For example, a link metric protocol (e.g. P1905.1 Link Metric Query/Response Messages) is used to gather link metric information from the hybrid devices in the hybrid network. Each hybrid device measures link metrics for the local interfaces, and the link metric information may include link media type, link data rate (LR), medium availability (MA), packet drop rate (PDR), and buffer utilization (BU). A first hybrid device can query a second hybrid device (e.g. via a Link Metric Query Message) to obtain the link metrics for interfaces at the second hybrid device. The second hybrid device can report the link metrics (e.g. via a Link Metric Response message) so that the first hybrid device has the link metric information about the interfaces at the second hybrid device. The Link Metric Response message may include some or all of the link metric information determined at the responding hybrid device. The Link Metric Query/Response protocol may be performed periodically, in response to a network change, or when a new path selection is prompted by an incoming packet.

In the topology map, the link may be represented by a pair interfaces at directly connected neighbors. For example, the link from interface a1 on hybrid device A to the interface b1 on hybrid device B may be represented as the link A(a1)++B(b1). In an example implementation, the link data rate (LR) may be defined as the maximum goodput (bps) at the MAC layer, after protocol overheads, for a link, e.g., A(a1)++B(b1). It should be noted that the link data rate is measured by each of HD A and HD B, so that the link metric is "directional" and specific to the interface on each device. For example, HD B will measure the link data rate of interface b1 for the link to A(a1), and will report the link data rate to HD A. The HD A will measure the link data rate of interface a1 for the link to B(b1) and will report the link data rate to HD B. In the example implementation, medium availability (MA) may represent the percentage of time the medium is available for an interface to transmit or receive. Note that MA of an interface A(a1) may be inversely correlated to medium utilization (MU). MU may be defined as the percentage of time the medium is occupied by existing traffic and hence unavailable for new traffic. Packet Drop Rate (PDR) of an interface may be defined as the number of packets dropped at the interface compared to the number of total packets sent to the interface by a higher layer (such as the abstraction layer of P1905.1 draft standard). Buffer Utilization (BU) may be defined as the amount of buffer utilized for a particular interface. It should be understood that the link metrics may also be different for different MAC priorities. For example, an interface may support multiple priorities and have different values of MA, PDR, and BU based on each priority for a particular interface.

Based on the link metrics reported by other hybrid devices, the first hybrid device can calculate directional link capacity for each interface and for each priority. For example, a link capacity LC for the link from A(a1)++B(b1) may be defined as the link rate LR of the link times the medium availability MA measured at A(a1). The link capacity is therefore a directional link capacity for a link from a first interface of a first hybrid device to a second interface of a second hybrid device. The link capacities for each link in the topology map can be determined in a similar way.

The topology map also includes information about the type of medium used for each link. This may be useful, for example, when calculating capacity for an end-to-end path. In traditional routing protocols, a path capacity may only account for the minimum link capacity of all the links in the path. However, for some types of contention-based medium, it may be necessary to account for the effects of the shared medium. For example, powerline communications (PLC) and WLAN portions of a network may use the same medium more than once in the path from a source to a destination device. Conventional shortest path algorithms, such as Djikstra's algorithm (as used by most link-state routing protocols) fail to account for the effects of shared medium when calculating the path cost. An end-to-end path metric takes into account contention groups associated with shared media as well as unpredictable network conditions caused by legacy bridges in the hybrid network. In this disclosure, a next hop of a path associated with an application stream is selected based upon end-to-end path metrics associated with hybrid network paths.

Figure 9:
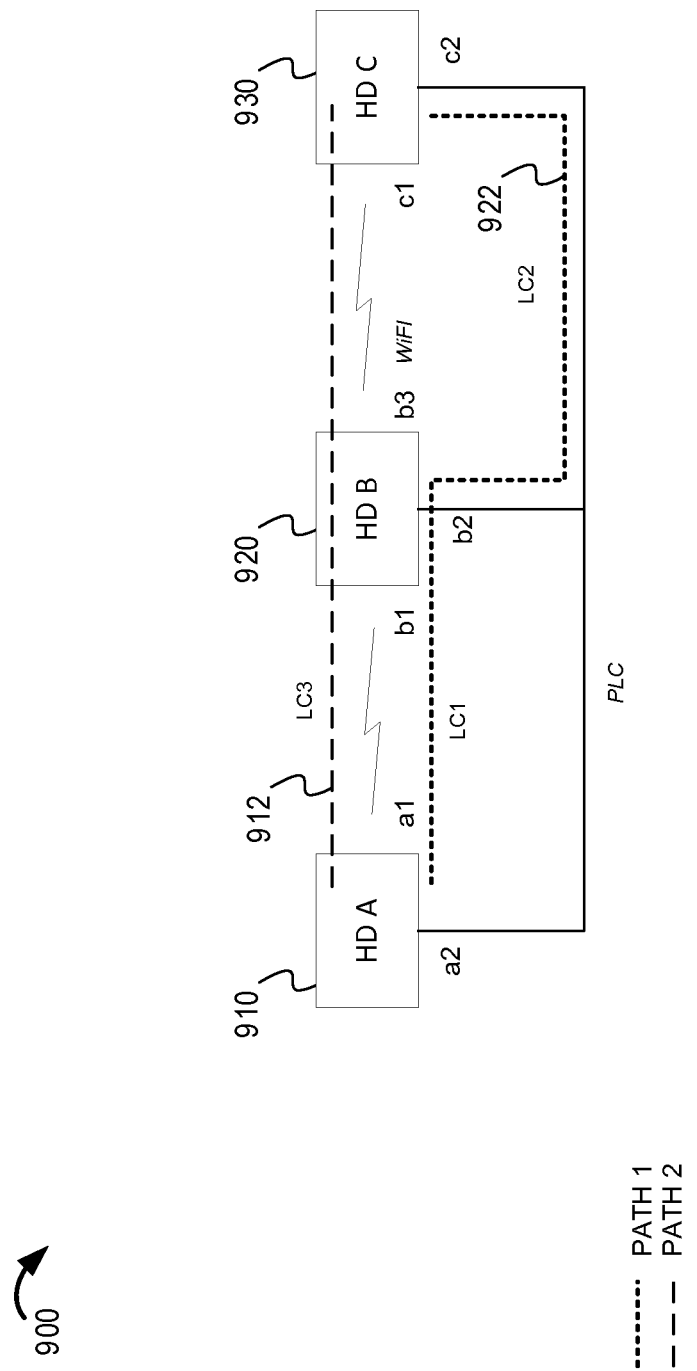
FIG. 9 is another example system diagram illustrating example operations associated determining path capacities based on contention groups in a hybrid network.

FIG. 9 is another example system diagram illustrating example operations associated determining path capacities based on contention groups. In FIG. 9, an example network 900 includes a hybrid device 910 ("A") that has an interface A(a1) with a WLAN link to interface B(b1) of hybrid device 920 ("B"). Hybrid device 910 also has an interface A(a2) to a PLC network. Hybrid device 920, in addition to the B(b1) interface to a WLAN link to A(a1), has an interface B(b2) to the PLC network and B(b3) to another WLAN link to interface C(c1) of hybrid device 930 ("C"). The example network may include multiple paths between hybrid device 910 and hybrid device 930 via the hybrid device 920, as shown in FIG. 9. Various paths may include a mix of WLAN links and/or PLC links.

Of the various paths from hybrid device 910 to hybrid device 930, in this example, two paths are described to highlight the effect of "self-contention" due to shared medium. A first path 922 utilizes the path {A(a1)++B(b1) *B*B(b2)++C(c2)}. A second path 912 utilizes the path {A(a1)++B(b1)*B*B(b3)++C(c1)}. The link capacity "LC1" may be defined as the link capacity from A(a1) to B(b1). The link capacity "LC2" may be defined as the link capacity from B(b2) to C(c2). The link capacity "LC3" may be defined as the link capacity from A(a1) to B(b1). To simplify the example, assume that LC1=LC2=LC3 and can be referred to as LC. In FIG. 9, hybrid device 910 has a packet destined for hybrid device 930 (or a legacy device that is a direct legacy neighbor of hybrid device 930). The hybrid device 910 is comparing two potential paths (path 1 and path 2). For path 1, the hybrid device 910 would transmit via WLAN in a first hop to the hybrid device 920 and would expect the hybrid device 920 to retransmit the packet via PLC in a second hop to the hybrid device 930. The first and second hops utilize different medium which are independent of each other. Therefore the end-to-end path capacity is the lower of LC1 and LC2. Since the hypothetical uses LC=LC1=LC2, then the end-to-end path capacity is LC.

Next, the hybrid device 910 calculates the end-to-end path capacity for path 2. For path 2, the hybrid device 910 would transmit via WLAN in a first hop to the hybrid device 920 and would expect the hybrid device 920 to retransmit the packet via WLAN in a second hop to the hybrid device 930. The first and second hops utilize the same medium so the effective capacity of the second hop will be reduced due to the effect of the transmission in the first hop. Due to the effect of self-contention over the shared medium, the link capacity of each hop is effectively reduced by half (LC/2). Therefore the end-to-end path capacity for path 2 is at most LC/2.

To account for the effect of self-contention between links over a shared medium, link capacity may be calculated based on contention groups. It should be understood that an end-to-end path may have more than one contention group. Each contention group is determined based upon links in a path that share the same transmission medium. For example, all PLC links in a path are included in a contention group. All WLAN links that share the same frequency and channel are included in a contention group. Furthermore, if a legacy bridge is located between two hybrid devices in a path, the links through the legacy bridge may be combined to a contention group for the purposes of determining path capacity. The contention group that includes the legacy bridge may utilize the same link metric value as the first hop link, or may use the lowest link metric values of either the first hop or second hop through the legacy bridge. Finally, for links that are not already in a contention group for links in WLAN, PLC, or legacy bridges, the individual links are added to separate contention groups having only each individual link. Therefore, each path from a source to a destination will be made up of a plurality of contention groups. To define the contention groups, in one embodiment the following parameters may be considered: (a) all links within the same contention group interfere with each other; (b) links in different contention groups do not interfere with each other.

Figure 10:
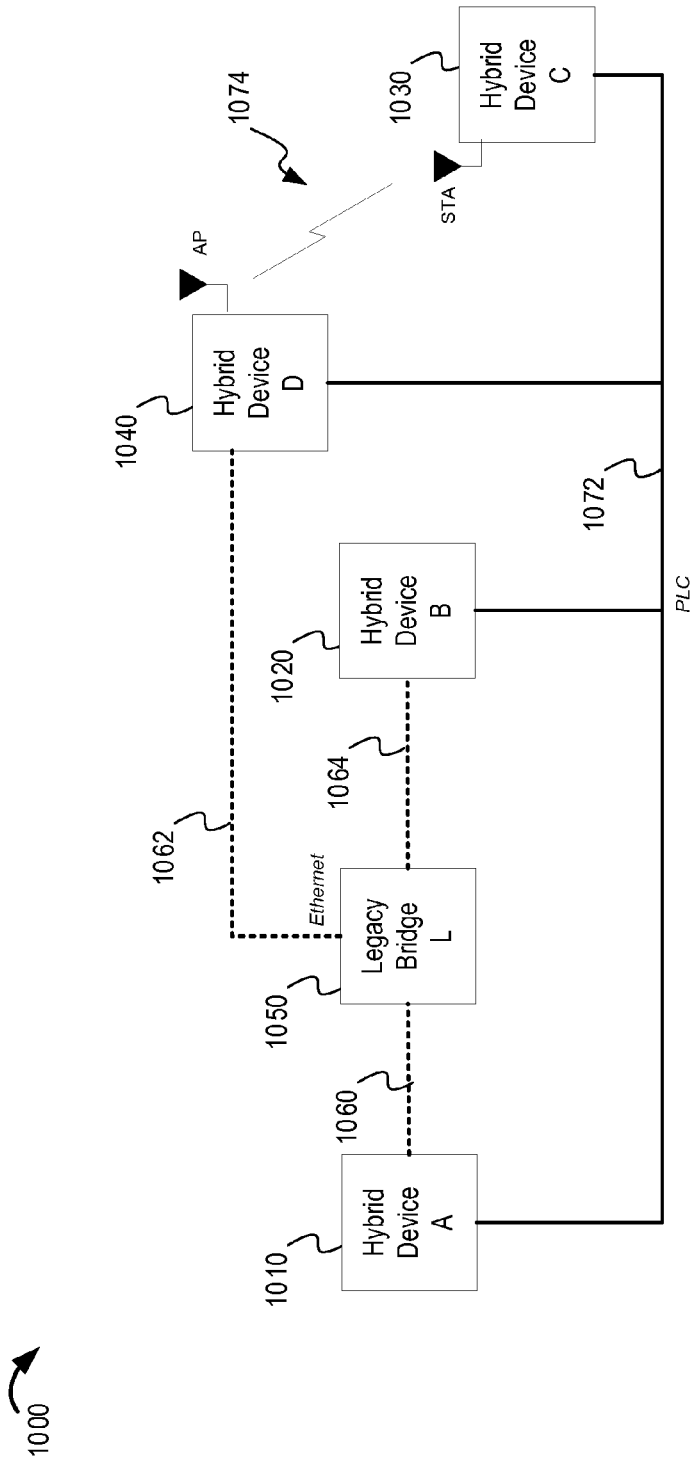
FIG. 10 is another example system diagram illustrating example operations associated with determining available path groups in a hybrid network.

Once contention groups are identified and defined for each path, the end-to-end path capacity ($PC_{e2e}$) for a particular path can be defined by the formula $PC_{e2e}=\min_i\{LC_{G\_i}\}$; where i is each contention group in the path, and $$LC_{G\_i} = \min_j \{MA_j\} \Big/ \sum_j \left(\frac{1}{LR_j}\right)$$

is the link capacity within the contention group i, and where j is a link in form of A(a1)++B(b1) in a contention group i. In other words, for each contention group, the contention group link capacity is the minimum media availability (of the links in the contention group) divided by the sum of the inverse of the link rate for each link in the contention group. Using this formula, the contention group link capacities are calculated. Once contention group capacities are calculated, the minimum capacity (from the contention group link capacities) is used as the path capacity for the path. Using these calculations, path capacities can be calculated for each path in the hybrid network FIG. 10 is another example system diagram illustrating example operations associated with determining available path groups in an example hybrid network 1000. Another tool to account for unique topologies in the hybrid network is the creation of available path groups (APG). Available path groups can be defined to group paths through the hybrid network prior to path selection. In an example topology, an available path group can be used to group two or more paths that traverse through a legacy bridge to different hybrid relays in the network.

For example, in FIG. 10, a hybrid device A 1010 may have traffic destined to hybrid device C 1030. A first potential path from HD A 1010 to HD C 1030 may include an Ethernet link 1060 to legacy bridging device (L) 1050, which sends the traffic via Ethernet link 1064 to HD B 1020, and the HD B 1020 sends the traffic via PLC 1072 to the HD C 1030. A second potential path from HD A 1010 to HD C 1030 may include an Ethernet link 1060 to the same legacy bridging device L 1050, which sends the traffic via Ethernet 1062 to a HD D 1040, and the HD D 1040 sends the traffic via WLAN 1074 to the HD C 1030. Both the first path and the second path traverse the same legacy bridging device L 1050. Due to the header field limit in an Ethernet frame, from the perspective of HD A 1010 the first path and the second path both have the same destination address (the HD C 1030) even though both paths traverse the legacy bridge L 1050. The capacity of the WLAN 1074 connection may be higher or lower than the capacity of the PLC 1072. However, HD A 1010 cannot determine which path the legacy bridging device L 1050 may use for the second hop. This means that end-to-end path capacity may be unpredictable.

To compare potentially unpredictable paths such as the first and second potential paths described above, the HD A 1010 may group the first path and the second path as an available path group (APG). For purposes of comparing potential paths, the APG will have an end-to-end path capacity ($PC_{APG}$) determined based upon the path capacities of the paths grouped in the APG. For example, the end-to-end path capacity for the APG ($PC_{APG}$) may be related to the lowest of the path capacities of the paths in the APG. In the example above, if the WLAN 1074 link capacity was lower than the PLC 1072 link capacity, then it is possible that the second potential path capacity is lower than the first potential path capacity. For purposes of comparison, both the first and second potential paths are grouped together as an available path group having the $PC_{APG}$ defined as the path capacity of the second potential path. For each path, the contention groups are defined and a path capacity is calculated.

It should be understood that APGs can be defined such that all paths from a first hybrid device to a destination device can be included in one APG. Each one-hop path will be a separate APG. Paths that have more than one hop are combined to an APG if they connect to different hybrid relays via a legacy bridge and have the same destination hybrid device (or a direct legacy neighbor device of the same destination hybrid device). Remaining paths may be included in separate APGs defined for each remaining path for the purposes of comparing APGs.

Figure 11:
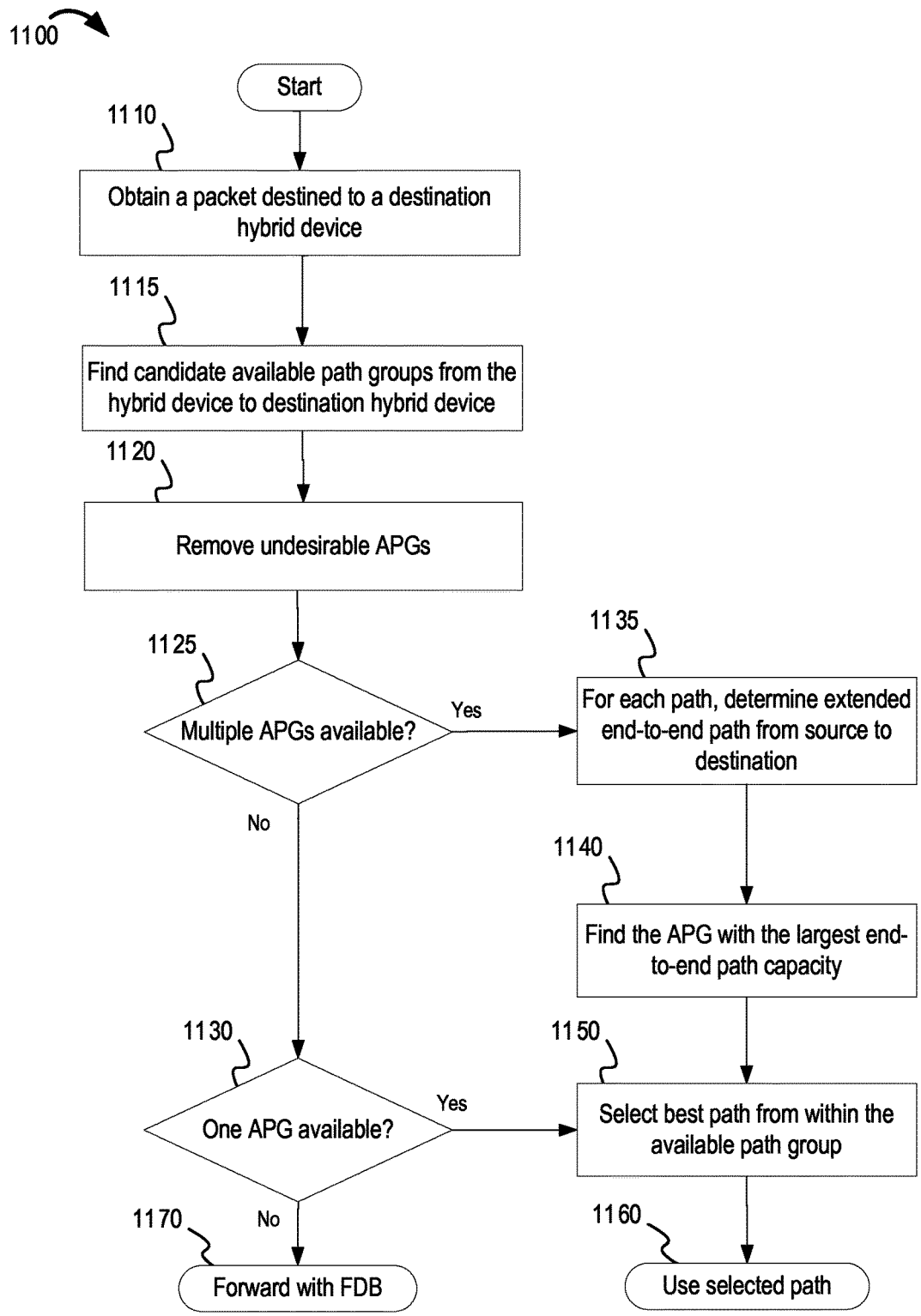
FIG. 11 is a flow diagram illustrating example operations for path selection in a hybrid network.

FIG. 11 is a flow diagram illustrating example operations for path selection algorithm 1100 associated with a new packet stream. In FIG. 11, beginning at 1110, a hybrid device obtains a packet destined to a destination hybrid device. For example, the hybrid device may receive an incoming packet on a first interface of the hybrid device. Alternatively, the packet may be received from an upper layer of the hybrid device. Upon inspecting the packet, the hybrid device determines which remote destination hybrid device is associated with the destination address of the packet (e.g. the destination address is either the destination hybrid device or a direct legacy neighbor of the destination hybrid device). At 1115, the hybrid device finds candidate available path groups from the hybrid device to the destination hybrid device. By reviewing the topology map, the hybrid device identifies which remote interface of the destination hybrid device has a direct legacy neighbor relationship to the destination address. The hybrid device searches for all paths from the first hybrid device to the target interface on the destination hybrid device. The paths may include bridged interfaces or legacy bridging devices. It should be noted that the destination address may be the address of another hybrid device or the address of another hybrid device that has a direct legacy neighbor relationship to a destination legacy device. Also, there may be multiple destination hybrid devices that have interfaces with a direct legacy neighbor relationship with the destination address, in which case the process is repeated until all potential paths are identified. The paths may then be grouped to determine candidate APGs. In the case where multiple destination hybrid devices have a direct legacy neighbor relationship to a destination legacy device, the process of determining paths and APGs may be repeated for each destination hybrid device having the destination legacy device as a DLN.

At 1120, after determining candidate APGs, the list of candidate APGs may be reduced by removing APGs with undesirable paths. For example, if the hybrid device has another existing stream with the same destination address as the current packet, then the hybrid device may remove any APGs having a path using a same egress interface as an existing stream, but a different next hop hybrid device. This is to prevent to packet streams destined to the same destination address from traversing two different relay hybrid devices via the same egress interface. For example, this "destination address (DA) constraint" is imposed so that all packets having the same DA and same egress interface must use the same next hop IL MAC.

In an implementation, the APGs which have more than two hops may be removed from consideration. Furthermore, if the first hybrid device is a relay hybrid device (it has received the incoming packet from an upstream hybrid device and the DA is a downstream hybrid device), the first hybrid device may remove APGs that have more than one hop. It is anticipated that in the hybrid network environment, no path through the hybrid network should require more than two hops. In other implementations, larger number of hops may be allowed. If multiple APGs remain, the first hybrid device may remove APGs based on hop count so that one-hop paths are preferred over multi-hop paths. Furthermore, APGs with two-hop paths in which a relay device has more than one path to the DA may be preferred over APGs with a two-hop path in which the relay device has only one path to the DA. It should be noted that these filtering criteria may be optionally implemented and combined in various orders.

At 1125, the hybrid device determines if multiple candidate APGs remain after removing APGs with undesirable paths. If there are not multiple APGs available, the process continues to block 1130. If there are multiple APGs available, then the process continues to block 1135. At 1135, for each path of each remaining APG, the first hybrid device determines an extended end-to-end path capacity $PC_{e2e}$ for each path from the source to the destination. An APG path capacity may be determined based upon the lowest $PC_{e2e}$ of the paths included in the APG. The $PC_{e2e}$ may also consider the effects of contention groups—including contention groups that may include the ingress interface of the hybrid device processing an incoming packet (e.g. if the ingress interface uses the same media type as a next hop in the path). Furthermore, the contention group may be extended to include a link to a destination legacy device if the packet is destined to a legacy device and the destination hybrid device utilizes the same media to connect to the legacy device as the last hop to the destination hybrid device. The link capacity for the legacy links (either the link from the source legacy device to the first hybrid device, or the link from the destination hybrid device to the destination legacy device) may be estimated based upon the link capacity of another link in the contention group. The extended $PC_{e2e}$ is calculated for all paths in the APG, and then the lowest extended $PC_{e2e}$ is used as the $PC_{APG}$. At 1140, the APG with the highest $PC_{APG}$ is selected. In the event that multiple candidate APGs have the same APG path capacity, then ties may be broken based upon hop count, priority numbers, randomly, or a consistent algorithm.

At 1150, once the APG has been selected, if there are multiple paths in the APG, the first hybrid device may select the path in the APG that has the highest extended $PC_{e2e}$. If necessary, ties between multiple paths may be broken (e.g. by hop count). The path defines the egress interface of the first hybrid device as well as the next hop IL MAC of the next hybrid device in the path. At 1160, the selected path is used to forward packets for the stream. The forwarding table is updated to include the stream identification information, the egress interface, and the next hop IL MAC address.

At 1130, the hybrid device determines if one candidate APGs remains available. If there is a candidate APG available, then at 1150, the hybrid device selects the path in the APG that has the highest extended $PC_{e2e}$ as described above. If at 1130, there are no available APGs, the process continues to 1170. At 1170, the incoming packet may be forwarded based on a traditional forwarding database (e.g. based on address learning for a particular interface). This might occur, for example, when the destination address is a legacy device connected via a legacy network at a local interface of the hybrid device.

Figure 12:
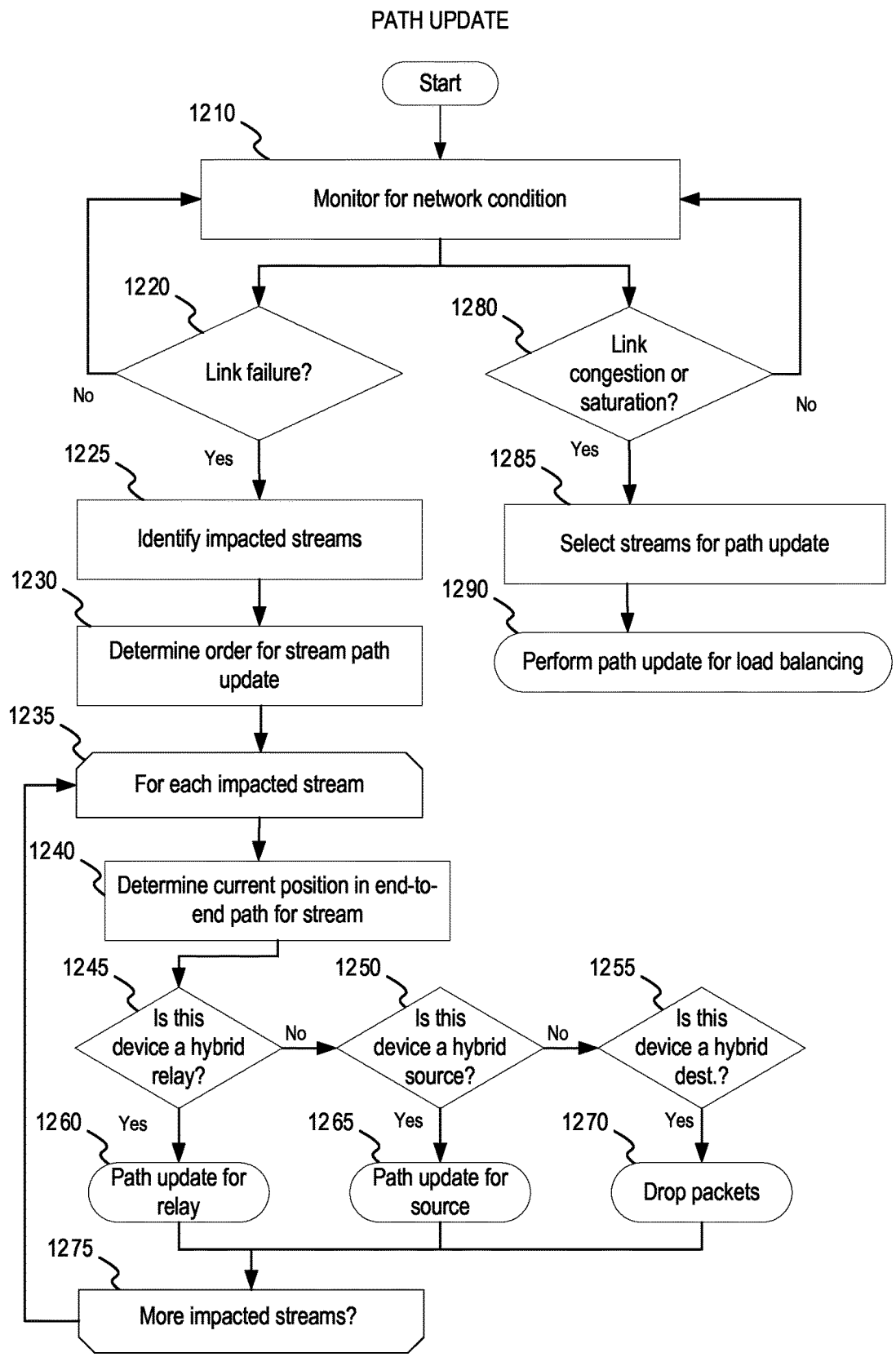
FIG. 12 is a flow diagram illustrating example operations for triggering a path update in a hybrid network.

FIG. 12 is a flow diagram illustrating example operations for triggering a path update in a hybrid network. There may be conditions which would prompt a hybrid device initiate a path update algorithm for selecting a new path for a packet stream. A path update may occur, for example, in response to a change in network topology or a traffic loading condition (e.g. congestion or saturation of a link in the current path). At block 1210, the hybrid device monitors for a network condition that might trigger a path update.

At 1220, one network condition that may prompt a path update is a link failure. A link failure may be detected based upon either a network discovery protocol or link interface characteristic. For example, if a network discovery protocol requires periodic topology discovery messages from direct peers, and the topology discovery message for a direct peer fails to be detected within a threshold time period, a hybrid device may assume that a link to the direct peer has failed. In P1905.1 draft standard, direct hybrid neighbors exchange topology discovery messages periodically. If a topology discovery message is not received on an interface within a timeout period, the links associated with the interface may have failed. Other events that indicate link failure include a disassociation event on a WLAN interface or detection that an Ethernet cable has been unplugged from an Ethernet interface. Alternatively, a link failure may be determined based upon link capacity or some other link metric falling below a predefined threshold (e.g. LC falling below a predefined threshold on a PLC interface). Upon determining a local link failure, a hybrid device will trigger a path update in response to the local link failure, and will send a topology notification message to other HDs in the hybrid network so that they may also consider a path update in response to the link failure. The topology notification message may, for example, trigger a path selection update at an upstream hybrid device that receives the topology notification message from a downstream hybrid device having a link failure in the current path.

If a link failure is detected at 1220, then at 1225 impacted streams are identified based upon the topology map and location of the link failure. For example, for a local link failure, a hybrid device checks its forwarding table to find all the impacted streams whose forwarding decision (egress IL MAC and next hop IL MAC) matches the failed link. For a link failure reported in a topology notification message from a second hybrid device, a first hybrid device determines existing streams from the first hybrid device that can no longer be relayed by the second hybrid device. Note that if the destination for a stream is either the second hybrid device (or a direct legacy neighbor of the second hybrid device), then path update is not performed for that stream—packets will continue to be sent to the second hybrid device if possible, or dropped if the link failure is between the first hybrid device and the second hybrid device. However, where the second hybrid device is a hybrid relay to a third hybrid device, then the first hybrid device analyzes the topology change to determine whether there is another one-hop link from the second hybrid device to the third hybrid device. If there is another one-hop link from the second hybrid device to the third hybrid device, then path update is not performed for that stream. Otherwise, the first hybrid device determines that the second hybrid device cannot relay packets of the stream from the first hybrid device to the third hybrid device, and in response the first hybrid device identifies the stream as impacted.

Once the impacted streams are identified, at 1230 the first hybrid device determines an order in which to move (also referred to as redirect, path switch, or path update) the streams to new selected paths. In an example implementation, the path updates of the impacted streams are performed one by one based on order of priority or class of service (e.g. per PCP/DSCP of the stream). Streams having the same priority or class of service may be ordered based on protocol type (e.g. UDP streams may be moved before non-UDP streams). Lastly, if multiple streams have the same priority or class of service and the same protocol type, the streams may be ordered based upon stream data rate (e.g. streams with higher stream data rate (SDR) may be scheduled before streams with lower SDR). Once the streams are ordered, the path update mechanism may be performed for each stream one at a time so that the effects of a path update can be calculated before performing a next path update for a next stream.

At 1235, for each impacted stream in the ordered list of impacted streams, a process continues to block 1240. The path update algorithm is slightly different depending on whether the path update algorithm is performed by a relay hybrid device, a source hybrid device, or a destination hybrid device. At block 1240, the hybrid device determines its current position in the end-to-end path for the stream. In an example hybrid network topology, paths may be limited by two hops, which could include three hybrid devices in the path. In other network topologies, more than two hops may be allowed. The examples provided herein are based upon a two-hop maximum, but the concepts can easily be extrapolated to paths with larger hop maximums.

At 1245, if the hybrid device is a relay hybrid device in the current path, then a path update process for hybrid relays is performed at 1260. The path update process for hybrid relays is described in FIG. 14. If the hybrid device is not a relay hybrid device, then at 1250, if the hybrid device is a source hybrid device in the current path, a path update process for source hybrid devices is performed at 1265. The path update process for source hybrid devices is described in FIG. 13. If the hybrid device is not a relay hybrid device or a source hybrid device, then it may be a destination hybrid device. At 1255, if the hybrid device is a destination hybrid device, then path update may not be possible. If the link failure is associated with a link to the destination address, then packets are simply dropped (at 1270) at the destination hybrid device. Continuing with the link failure routine, if there are additional impacted streams at 1275, the process returns to block 1235 for the next impacted stream in the ordered list of impacted streams.

Returning to the top of FIG. 12, another network condition that may prompt a path update algorithm is a change in link metrics or a traffic condition. When a change in link metrics or traffic condition is detected, a path update may be triggered for load balancing. During the runtime of each HD, the HD continuously monitors the condition of its interface and measures the local link metrics information periodically (e.g. every LINK_METRICS_MEASURE_INTVL seconds). Based on the measured link metrics values, a link may be identified as congested or saturated. At 1280, if a link is congested or saturated, then at 1285 a process to select candidate streams for path update is initiated. The process for selecting candidate streams for path update is described in FIG. 15. At 1290, a path update algorithm to move or redirect one or more selected candidate streams is initiated.

Figure 13:
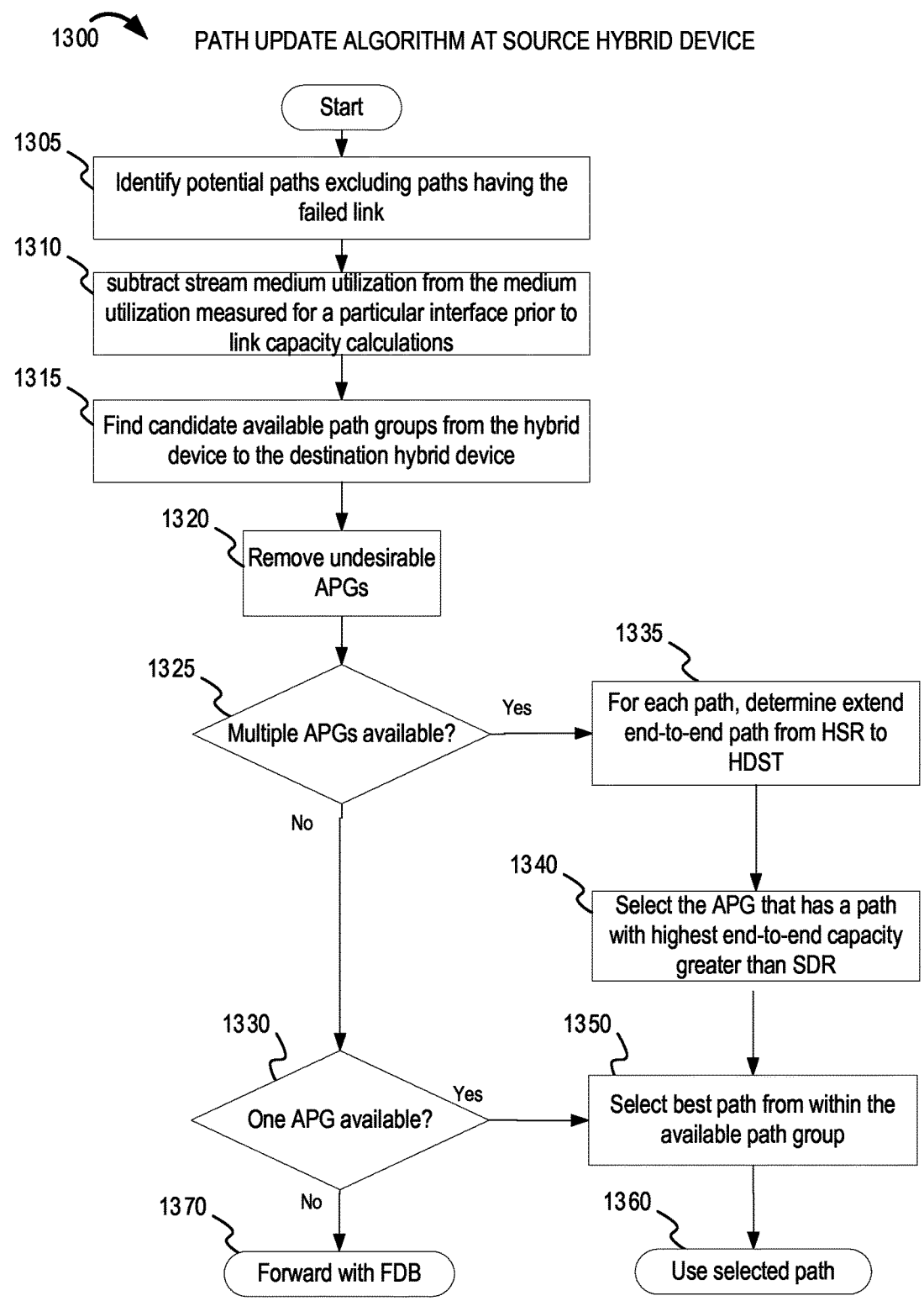
FIG. 13 is a flow diagram illustrating example operations for path update at a source hybrid device in a hybrid network.

FIG. 13 is a flow diagram illustrating example operations for path update at a source hybrid device which is either generating traffic for a destination device or is retransmitting traffic from a legacy neighbor to the destination device. The first hybrid device determines a destination address based upon the destination address of a destination hybrid device (or the address of a destination hybrid device that has a direct neighbor relationship to the destination device). FIG. 13 shows an example algorithm 1300 for selecting a new path for an existing packet stream.

In FIG. 13, a source hybrid device is selecting a path for an incoming packet received on a first interface of the first hybrid device. The first hybrid device determines all paths from the first interface of first hybrid device to the destination address (DA). The destination address may be the address of another hybrid device or the address of another hybrid device that has a direct legacy neighbor relationship to a destination legacy device. At 1305, the first hybrid device determines all paths to the destination address, including paths which traverse bridging hybrid devices or bridging legacy devices. Paths which have the failed link will not be included as potential paths.

In the scenario where the path update algorithm was triggered by a topology notification message, the first hybrid device may be an upstream hybrid device that is upstream in the path from the hybrid device that detected the link failure. While paths that include the failed link are removed from consideration, it is possible that the newly selected path may continue to use the same egress interface of the first hybrid device. To make sure that the paths are compared accurately, when calculating the path capacity for each path, at 1310 the stream media utilization (SMU) associated with the stream is subtracted from the media utilization (MU) of the interface that carries the current path.

Blocks 1315-1370 function similarly to operations 1115-1170 described in FIG. 11. At 1315, candidate available path groups are defined. At 1320, undesirable APGs are removed from further consideration. At 1325, the hybrid device determines if multiple candidate APGs remain after removing APGs with undesirable paths. If there are not multiple APGs available, the process continues to block 1330. If there are multiple APGs available, then the process continues to block 1335. At 1335, the extended end-to-end path capacities are calculated for paths from the source hybrid device (HSR) to the destination hybrid device (HDST). At 1340, the APG having a path with the highest end-to-end capacity is selected. It should be noted that in this figure, path update will only be permitted if the selected APG has an extended end-to-end path capacity greater than the current stream data rate (SDR) associated with the existing stream. In other words, an existing stream will not be moved to a new path unless the new path is capable of carrying the stream data rate associated with the existing stream. At 1350, the hybrid device selects the best path from the selected APG, and uses the selected path at 1360. Similar to FIG. 11, at 1330, the hybrid device determines if one candidate APGs remains available. If there is a candidate APG available, then at 1350, the hybrid device selects the path in the APG that has the highest extended $PC_{e2e}$ as described above. If at 1330, there are no available APGs, the process continues to 1370. At 1370, the hybrid device may forward the packets based on the traditional forwarding database. Because this algorithm is performed for a path update of an existing packet stream, and triggered based upon link failure, it is possible that packets will be dropped if no link is available to carry the egress packet.

Figure 14:
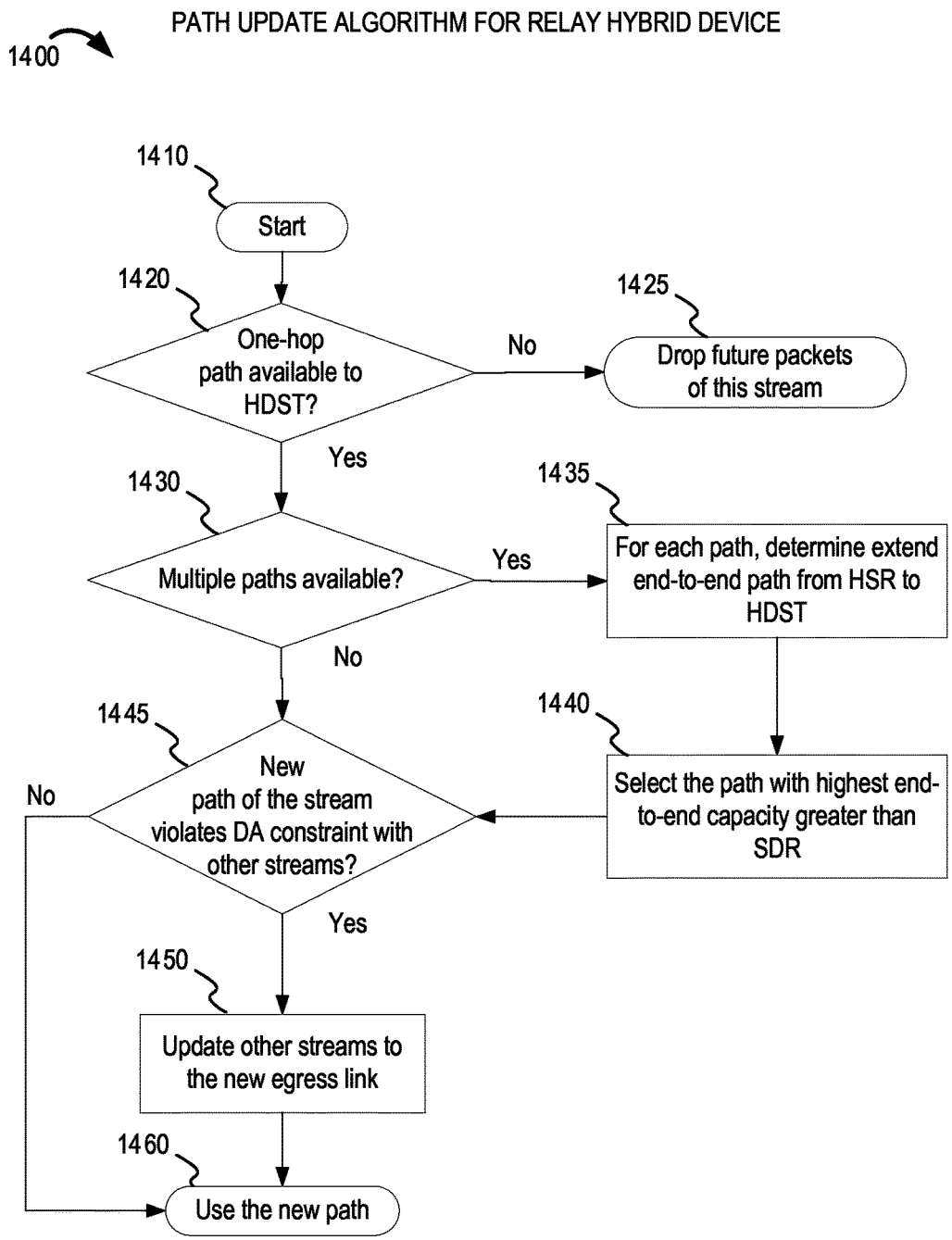
FIG. 14 is a flow diagram illustrating example operations for path update at a relay hybrid device in a hybrid network.

FIG. 14 is a flow diagram illustrating example operations for path update at a relay hybrid device. In FIG. 14, the example path update algorithm 1400 is performed by a relay hybrid device which is relaying traffic from an upstream source hybrid device to a downstream destination hybrid device. In some implementations, due to the imposed two hop maximum in the example topology, a relay hybrid device will only consider one-hop paths to the destination hybrid device. This is because a previous hop has already occurred in the path (from the upstream hybrid device to the relay hybrid device). It is noted that other examples may utilize a higher maximum hop count in which case the relay hybrid device may calculate the number of previous hops to determine the hop count limit for remaining candidate paths.

At 1420, the hybrid device (relay hybrid device) determines if there are any one-hop paths to the destination hybrid device (one less hop than the maximum two-hop limitation in the current example). In the example of a two-hop maximum, at 1425 the relay hybrid device will drop packets for the stream if there is no alternative one-hop path to the destination hybrid device. One reason for dropping packets (rather than rerouting to a further relay hybrid device) is to avoid potential loops in the hybrid network. It is assumed that the source hybrid device can perform path reselection.

At 1430, if multiple one-hop paths are available from the relay hybrid device to the destination hybrid device, then at 1435 the relay hybrid device determines the path capacity associated with end-to-end path from the source hybrid device (HSR) to the destination hybrid device (HDST). It is noted that the path is extended to include the link capacities of upstream links in the path—this is done so that comparison of the available paths is based upon end-to-end path capacity. At 1440, the relay hybrid device will select the path with the smallest hop count among end-to-end paths and which have a calculated end-to-end path capacity greater than the stream data rate (SDR) of the stream being moved. Alternatively, if there are multiple paths having the same hop count and calculated end-to-end path capacity greater than the SDR of the stream being move, then the relay hybrid device will select the path with the largest end-to-end path capacity.

At 1445, the relay hybrid device determines whether the newly selected path for the stream violates the DA constraint with other existing streams. It is noted that if the new forwarding decision ("egress IL MAC" and "next hop IL MAC") of the stream violates the "DA constraint" with other streams at relay hybrid device for the interface identified by the "egress IL MAC", at 1450 the relay hybrid device will also update the "next hop IL MAC" of the other streams to the "next hop IL MAC" of the stream. The DA constraint may be an implementation-specific policy imposed so that all packets having the same DA and same egress interface must use the same next hop IL MAC. This happen if the relay hybrid device is a relay for some streams to the destination hybrid device, but it is also a source hybrid device for other streams using two-hop paths to the destination hybrid device. Once a new path has been selected the new path is used to forward further packets for the stream at 1460.

Figure 15:
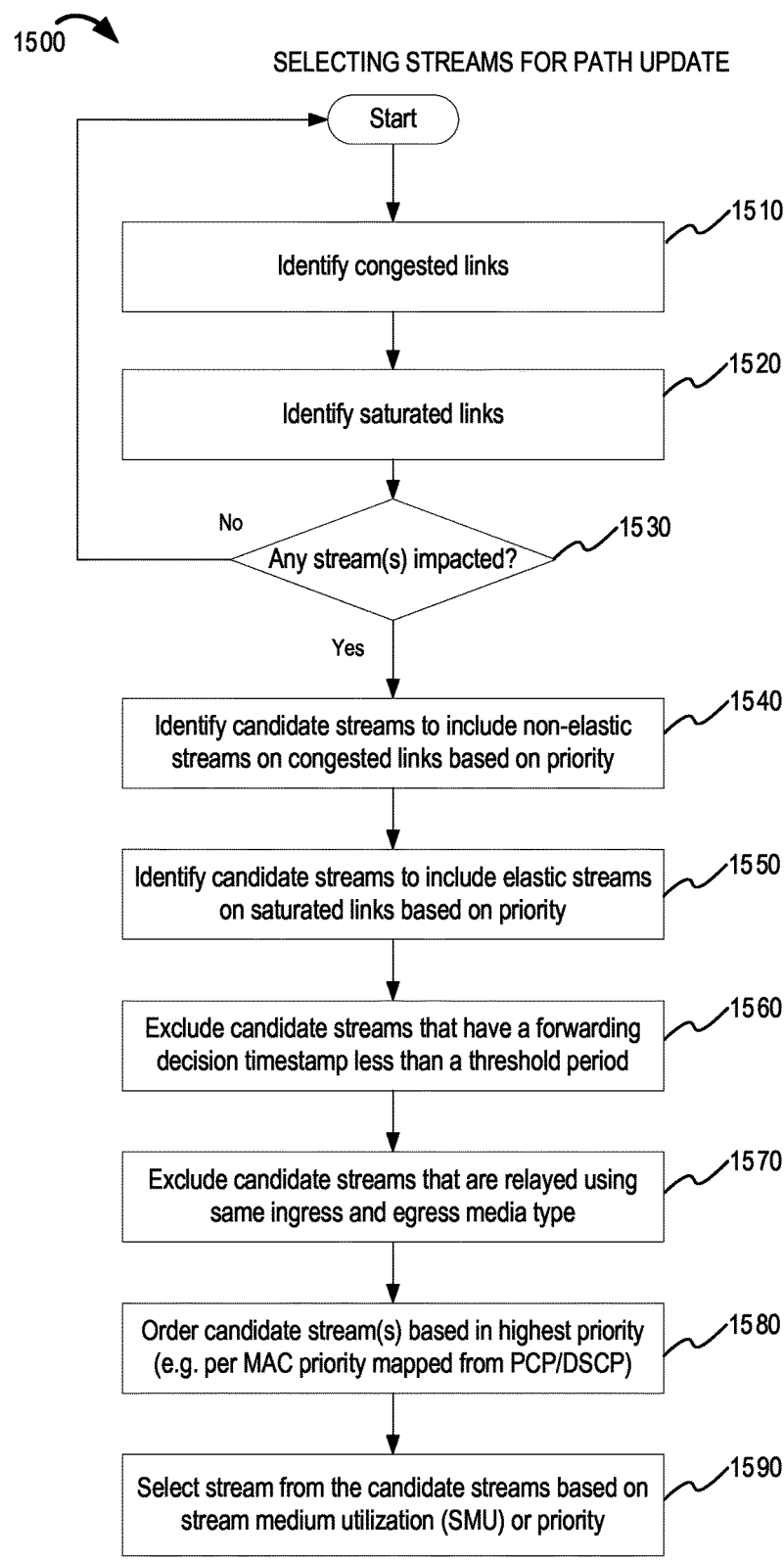
FIG. 15 is a flow diagram illustrating example operations for selecting one or more streams for path update in a hybrid network.

FIG. 15 is a flow diagram illustrating example operations for selecting one or more streams for path update based on load balancing. A path update may be prompted to load balance as a result of a change in link metrics or traffic condition. In FIG. 15, an example algorithm 1500 is used to identify a load balance requirement and select candidate streams to update paths in response to the load balance requirement. During normal operation, each hybrid device will monitor the condition of its interface and measure the local link metrics information periodically (e.g. every LINK_METRICS_MEASURE_INTVL seconds). Based on the measured link metrics values, the following link states may be defined for each interface (and per MAC priority):

Congested: interface overloaded by non-elastic streams (UDP protocol) which leads to high packet drop rates. Interface congestion is detected if a packet drop rate (PDR) exceeds a threshold level (e.g. CONGESTED_LINK_PDR)

Saturated: interface saturated by elastic streams (TCP protocol). When a link is saturated, only elastic streams are impacted. Interface saturation is detected if the PDR is below a threshold level, and medium utilization (MU) is above a predefined saturation level (e.g. SATURATED_LINK_MU) and the buffer utilization (BU) is above a predefined saturation level (e.g. SATURATED_LINK_BU)

Normal: neither congested nor saturated.

In one embodiment, the link metrics (PDR/MU/BU) are collected per MAC priority. Therefore, the interface state is per MAC priority. The high priority streams on the interface may not be impacted even if the interface is congested or saturated for low priority streams.

At 1510, the hybrid device determines if there are any congested links. At 1520, the hybrid device determines if there are any saturated links. In one embodiment, triggered notification may be used to identify congested or saturated links. In one embodiment, a monitory agent may periodically check the packet drop rate, medium utilization and buffer utilization associated with each local link. At 1530, the hybrid device determines whether any streams are impacted by congested or saturated links. If no streams are impacted, the hybrid device continues to monitor for congested or saturated links.

Upon detecting interface congestion or saturation, the hybrid device will try to resolve the congestion or saturation by moving the impacted streams to another path. Unlike link failure scenario, the hybrid device may only move an impacted stream if a better path is available (given the stream data rate on the current path). In this disclosure, the streams are identified as elastic if they are using TCP and non-elastic if they are using UDP. The identification of candidate streams is based upon the link state (e.g. congested or saturated) and the type of streams impacted (e.g. elastic or non-elastic). At 1540, candidate non-elastic streams that are impacted by a congested link are identified based on priority. For example, if an interface is congested for MAC priority n, then existing non-elastic (UDP) streams with a priority value n (or higher, numerically) are included in the list of candidate streams. At 1550, candidate elastic streams that are impacted by a saturated link are identified based on priority. For example, if an interface is saturated for MAC priority n, then existing elastic (TCP) streams with a priority value n (or higher, numerically) are included in the list of candidate streams to move. The priority numbers may be based upon a mapping of PCP/DSCP values in higher layer headers to the MAC priority values. Typically MAC priority 0 is the highest priority in a hybrid network.

In some embodiments, there may be a delay (e.g., a configurable delay) between moving or redirecting a stream away from a transmission medium due to an oversubscription event and re-measuring medium utilization of the transmission medium. The delay may be desirable to allow sufficient time for new measurements after a stream is moved or redirected such that updated data/statistics will be used and the transmission medium will not be incorrectly determined to still be oversubscribed based on older data/statistics. At 1560, to prevent the frequent moving of streams and allow time for link metrics to be recalculated, a holddown time might be used. For example, a forwarding decision timestamp may be included for each entry in the forwarding table. When identifying candidate streams to move for load balancing, only streams whose forwarding decision timestamp is greater than a minimum time period (e.g. MIN_STREAM_DURATION) are considered, in one embodiment.

At 1570, any candidate streams that have been identified at 1540 and 1550 are excluded if they are relayed using the same ingress and egress media type. In an implementation, a relay hybrid device may determine that the ingress network segment is the same as the egress network segment for a stream. Upon determining that the relay hybrid device has congestion or saturation for the same interface handling the ingress and egress network segment, the relay hybrid device may refrain from performing a path update. As an example, if a stream is using WLAN as in ingress interface and WLAN as an egress interface, the hybrid device may exclude that stream from the list of candidate streams to reselect a new path The congestion or saturation on the impaired network segment should be detected by the upstream source hybrid device on the impaired network segment (prior to the relay hybrid device). A relay hybrid device refrains from performing the path update in this scenario so that the upstream hybrid device may perform a path update.

At 1580, once candidate streams are identified based upon the congestion or saturation condition and the type of streams, the hybrid device determines an order in which to move the streams to new selected paths. In one example, the determination of order may be made similar to that described previously. At 1590, a stream is selected from the candidate streams. For example, the stream with the highest priority may be selected first. For streams having the same priority, streams with higher stream medium utilization (SMU) or higher stream data rate (SDR) may be scheduled before streams with lower SMU or lower SDR. Once one or more streams are selected, the path update algorithm is performed on the selected stream(s) in order.

Figure 16:
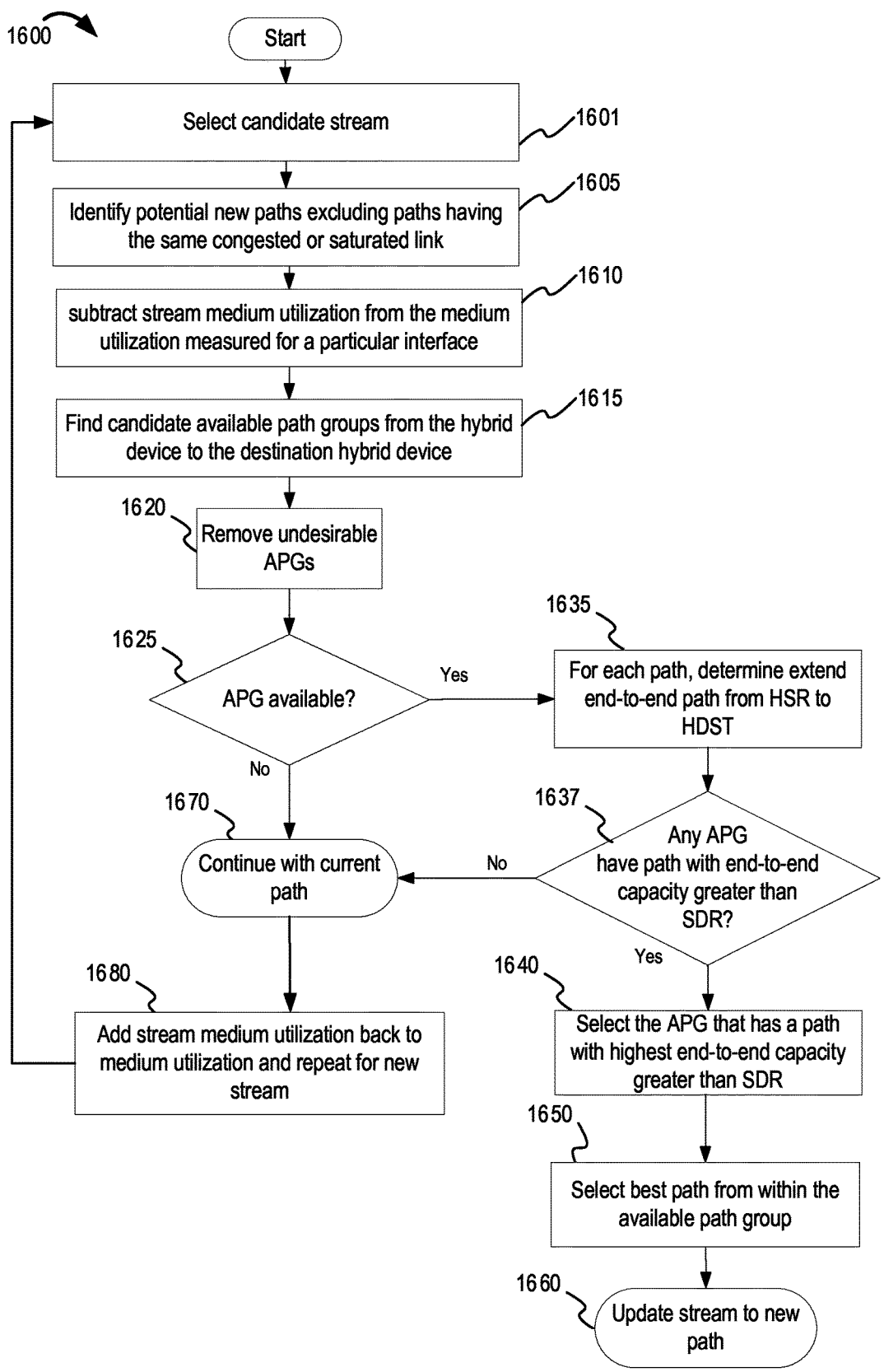
FIG. 16 is a flow diagram illustrating example operations for path update based upon load balancing in a hybrid network.

FIG. 16 is a flow diagram illustrating example operations for path update algorithm 1600 performed due to a congested or saturated link network condition. The algorithm 1600 may be performed iteratively for each selected candidate stream. Several operations of example algorithm 1600 are similar to corresponding operations in the path update algorithms described in FIGS. 11 and 13. One difference in FIG. 16 is that the path update algorithm is used to determine if a new path is available based upon the current stream data rate and/or stream medium utilization. If a new path is available, then the stream may be moved. It should be noted that if the hybrid device performing the path update algorithm is a relay hybrid device that is relaying packets in the existing path and if the network is limited to a two-hop maximum, then the relay hybrid device may only select new paths that are one-hop to the destination hybrid device. Furthermore, if the ingress interface at the hybrid device is a shared medium and a potential new path includes an egress interface with the same shared medium, then the potential new path is removed from consideration. If no alternative new path is available for a candidate stream, then the candidate stream is skipped and the next candidate stream is used in a further path update algorithm, and so on.

At 1601, a candidate stream is selected for path update. The selected candidate stream may be selected, for example, similar to the process described in FIG. 15. Blocks 1605-1660 are similar to corresponding blocks 1305-1360 of FIG. 13 and blocks 1115-1160 of FIG. 11. In the interest of brevity, the distinguishing features are described here, while relying on the descriptions of the previous Figures for common subject matter. At 1605, candidate paths are identified. In FIG. 16, because the algorithm is performed due to network condition, paths which have failed, congested, or saturated link will not be included as potential new paths. At 1610, the current stream medium utilization is subtracted from links in the current path, so that extended end-to-end capacity calculations better reflect a comparative capacity of the candidate paths. At 1615, available path groups may be defined to group certain paths. At 1620, the list of candidate APGs may be reduced by removing APGs with undesirable paths. At 1625, if there are any candidate APGs that remain after removing APGs with undesirable paths, the process continues to blocks 1635, 1637, 1640, 1650, 1660 in which an APG is selected and a path with the highest end-to-end capacity greater than the SDR from within the selected APG is used for the path update. One difference in this algorithm is at 1637, if there are no APG that has at least one path having an end-to-end path capacity greater than the current stream data rate, the hybrid device will continue using the current path at 1670 without performing a path update for the particular candidate stream. At 1670, the process continues by adding the SMU back to the medium utilization for the current egress interface and repeating the path update algorithm for another selected candidate stream.

Figure 17:
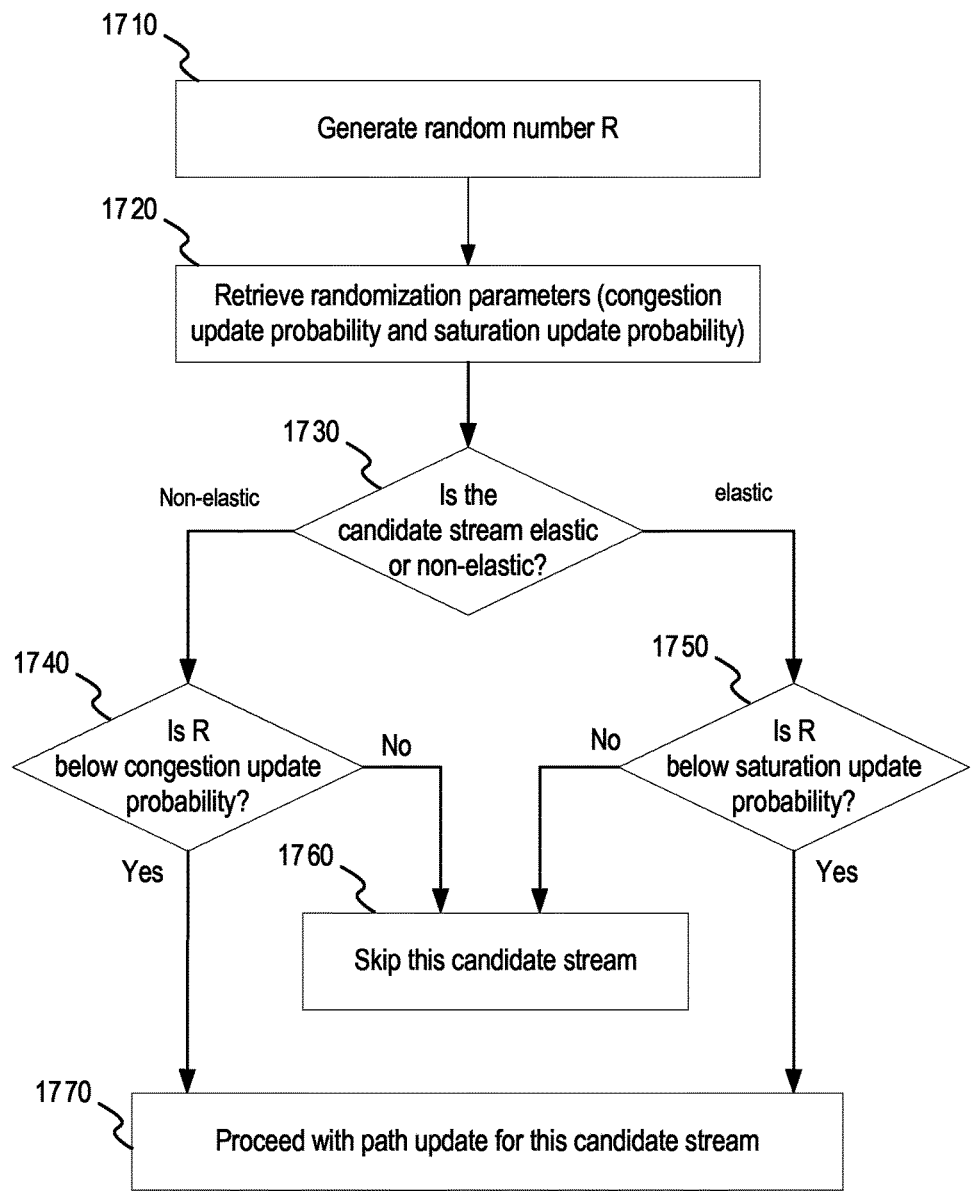
FIG. 17 is a flow diagram illustrating example operations for randomizing path reselection in a hybrid network.

FIG. 17 is a flow diagram illustrating example operations for randomizing path update/reselection. In some implementations, a random operation may be used to selectively update (i.e. move) the paths for the streams. At 1710, a random number R is generated for the candidate stream (e.g. between a range from 0 to 1). At 1720, the hybrid device may retrieve randomization parameters. The random number R is compared with the randomization parameters to determine, semi randomly, a 'yes' or 'no' decision whether to move the stream. The randomization parameters may be configurable thresholds and may be different values for congestion conditions and saturation conditions. At 1730, the hybrid device determines whether the candidate stream is elastic (TCP) or non-elastic (UDP). If the candidate stream is a non-elastic (UDP) stream, then the hybrid device determines whether the random number R is less than or equal to a first configured value (e.g. CONGESTION_UPDATE_PROBABILITY). If the random number R is less than or equal to the configured threshold for congestion update, then at 1770 the candidate stream is moved. Otherwise, at 1760, the hybrid device skips this particular stream and selects a new candidate stream. At 1730, if the candidate stream is an elastic (TCP) stream, then at 1750 the hybrid device determines if the random number R is less than or equal to a second configured value (e.g. SATURATION_UPDATE_PROBABILITY). If the random number R is above the threshold, then the path may not be updated for that stream at 1760. If the random number R is less than or equal to the second configured value then the path may be updated for the candidate stream at 1770.

The randomization of streams having path updates is introduced to avoid synchronization of streams by multiple hybrid devices in the hybrid network. For example, if a network condition existed without a hold-down timer or randomization process, then it might be possible that several hybrid devices move streams to paths that use the same link. It should be noted that any type of configurable threshold value could be used, and other types of comparisons could be made to achieve a semi-random effect for selecting candidate streams to move.

After a path update for a candidate stream, a hybrid device may wait to perform path update for further candidate streams until link metrics are recalculated and shared among the hybrid devices in the network. Alternatively, a hybrid device may perform load balancing procedures according to a pseudorandom delay or configurable periodic delay (preferably not synchronized with other hybrid devices in the hybrid network).

FIG. 18 is a table illustrating example data fields in a stream forwarding table that may be used in accordance with embodiments of the present disclosure. The stream forwarding table may be stored in memory, such as memory for storing the forwarding table 115 of FIG. 1 and memory 2013 of FIG. 20. It should be understood that various described fields in FIG. 18 may be excluded in certain implementations. Additional fields not described in FIG. 18 may also be included as needed to perform the algorithms described in this disclosure.

At 1810, several stream identification fields are described. The stream identification field may be used to store stream identification information (e.g. 5-tuple of source address, destination address, source port, destination port, and protocol)

At 1812 ("SA MAC address"), the stream identification fields may include a source address (SA) for the medium access control (MAC) entity that is sending MAC protocol data units for the stream.

At 1814, ("DA MAC address"), the stream identification fields may include a destination address (DA) for the MAC entity associated with a destination for the stream.

At 1816 ("SPORT"), the stream identification fields may include a source port of the stream.

At 1818 ("DPORT"), the stream identification fields may include a destination port of the stream.

At 1820 ("Protocol"), the stream identification fields may include an IP header protocol field of the stream.

At 1830, several forwarding decision fields are described. The forwarding decision fields may be associated with the forwarding action associated with a selected path.

At 1832 ("timestamp"), the forwarding decision fields may include a last time the forwarding decision fields are updated/created. This may be useful, for example, in the hold-down timers used for selecting or deselecting candidate streams to move for load balancing.

At 1834 ("Egress IL MAC"), the forwarding decision fields may include a MAC address of the egress interface at the local hybrid device.

At 1836 ("Next hop IL MAC"), the forwarding decision fields may include a MAC address of the target interface at the next hop hybrid device.

At 1840, several stream info fields are described. The stream info fields may be used to identify impacted streams for path update, candidate streams for load balancing, or other various path update or reporting processes.

At 1842 ("Ingress IL MAC"), the stream info fields may include an IL MAC of the latest ingress interface that received packets for the stream at the local hybrid device.

At 1844 ("PCP/DSCP"), the stream info fields may include the PCP/DSCP field associated with the packets of the stream. This information may be used for prioritization/ordering in path update algorithms.

At 1846 ("Stream Medium Utilization (SMU)"), the stream info fields may include a percentage of time used by the stream on the egress interface of the local hybrid device.

At 1848 ("Stream data rate (SDR)"), the stream info fields may include an incoming data rate (in bps) of the stream at the local hybrid device.

FIG. 19 is a table illustrating example configurable parameters related to topology mapping and path selection in a hybrid network. It should be understood that various described configurable parameters in FIG. 19 may be excluded in certain implementations. Additional configurable parameters not described in FIG. 19 may also be included as needed to perform the algorithms described in this disclosure.

At 1910 ("LINK_METRICS_MEASURE_INTVL"), the configurable parameters may include a setting for how often to update local link metrics measurements at a local hybrid device.

At 1912 ("LINK_METRICS_QUERY_INTVL"), the configurable parameters may include a setting for how often to send a query for link metrics from a local hybrid device to other hybrid devices.

At 1914 ("STREAM_TABLE_TIMEOUT"), the configurable parameters may include a setting for a maximum duration for a stream to be active without any incoming packet. After the maximum duration (timeout period) a stream may be removed from the stream forwarding table.

At 1916 ("CONGESTED_LINK_PDR"), the configurable parameters may include a setting for a packet drop rate (PDR) threshold at which a link is to be considered congested.

At 1918 ("SATURATED_LINK_MU"), the configurable parameters may include a setting for a medium utilization (MU) threshold at which a link is to be considered congested.

At 1920 ("SATURATED_LINK_BU"), the configurable parameters may include a setting for a buffer utilization (BU) threshold at which a link is to be considered congested.

At 1930 ("TOPOLOGY_TIMEOUT"), the configurable parameters may include a setting for a timeout value at which a link failure is triggered at a local hybrid device due to absence of receiving a P1905.1 topology discovery message at the link interface.

At 1932 ("DLN_PRUNING_TIMER"), the configurable parameters may include a setting for a timeout value before DLN pruning is triggered at a local hybrid device upon legacy neighbor list update.

At 1934 ("MIN_STREAM_DURATION"), the configurable parameters may include a setting for a minimum time to wait before changing the egress decision of a stream on a local hybrid device.

At 1940 ("CONGESTION_UPDATE_PROBABILITY"), the configurable parameters may include a setting for a configurable threshold probability associated with moving a congested stream to a new path when compared to a random number.

At 1942 ("SATURATION_UPDATE_PROBABILITY"), the configurable parameters may include a setting for a configurable threshold probability associated with moving a saturated stream to a new path when compared to a random number.

It should be understood that FIGS. 1-19 and the operations described herein are examples meant to aid in understanding embodiments and should not be used to limit embodiments or limit scope of the claims. Embodiments may perform additional operations, fewer operations, operations in a different order, operations in parallel, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 20:
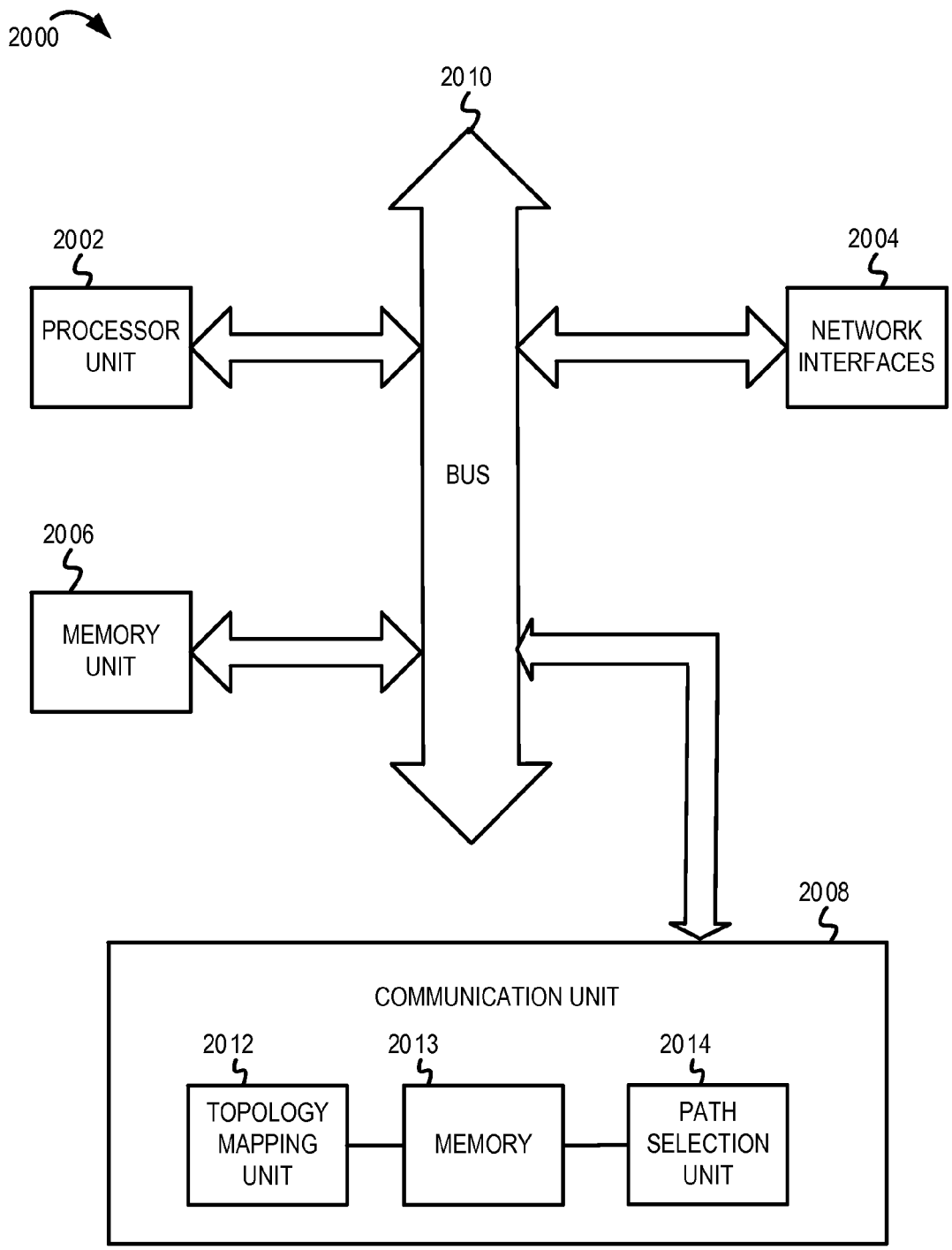
FIG. 20 is an example block diagram of one embodiment of an electronic device including a communication unit for topology mapping and path selection in a hybrid network.

FIG. 20 is an example block diagram of one embodiment of an electronic device 2000 including a communication unit for topology mapping and path selection in a hybrid network. In some implementations, the electronic device 2000 may be one of a laptop computer, a netbook, a mobile phone, a powerline communication device, a personal digital assistant (PDA), or other electronic systems comprising a hybrid communication unit configured to exchange communications across multiple communication networks (which form the hybrid communication network). The electronic device 2000 includes a processor unit 2002 (possibly including multiple processors, multiple cores, multiple nodes, and/or implementing multi-threading, etc.). The electronic device 2000 includes a memory unit 2006. The memory unit 2006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 2000 also includes a bus 2010 (e.g., PCI, ISA, PCI-Express, HyperTransport®, InfiniBand®, NuBus, AHB, AXI, etc.), and network interfaces 2004 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, a powerline communication interface, etc.). In some implementations, the electronic device 2000 may support multiple network interfaces—each of which is configured to couple the electronic device 2000 to a different communication network.

The electronic device 2000 also includes a communication unit 2008. The communication unit 2008 comprises a topology mapping unit 2012, a path selection unit 2014 and memory 2013. It should be understood, that in some embodiments, the communication unit 2008 may also have a dedicated processor (e.g., such as a communication unit comprising a system on a chip, or board with multiple chips, or multiple boards, in which the communication may have one or more dedicated processor or processing unit(s), in addition to the main processor 2002). As described above in FIGS. 1-19, the topology mapping unit 2012 implements functionality to determine whether a hybrid network that comprises the electronic device 2000 also comprises one or more legacy devices (also known as conventional devices). The topology mapping unit 2012 can also discover one or more other hybrid devices in the hybrid network and determine the presence and approximate direct legacy neighbor locations for one or more legacy devices in the hybrid network. The topology mapping unit 2012 may be configured to generate a topology map and store the topology map in the memory 2013. The path selection unit 2014 may be configured to select a path for a packet stream based upon the topology map. The path selection unit 2014 may be configured to store a selected path in a path forwarding table of the memory 2013 for use with subsequent packets of the stream. The path selection unit 2014 may also be configured to perform path update procedures in response to a network condition, such as link failure, topology change, or for load balancing. Any one of these functionalities may be partially (or entirely) implemented in hardware and/or on the processor unit 2002. For example, the functionality may be implemented with an application specific integrated circuit, in logic implemented in the processor unit 2002, in a co-processor on a peripheral device or card, etc. Further, realizations may include fewer or additional components not illustrated in FIG. 20 (e.g., video cards, audio cards, additional network interfaces, peripheral devices, etc.). The processor unit 2002, the memory unit 2006, and the network interfaces 2004 are coupled to the bus 2010. Although illustrated as being coupled to the bus 2010, the memory unit 2006 may be coupled to the processor unit 2002.

While the embodiments are described with reference to various implementations and exploitations, it will be understood that these embodiments are illustrative and that the scope of the inventive subject matter is not limited to them. In general, topology mapping and path selection as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for communicating via a hybrid network, the method comprising:
   receiving an incoming packet at a first hybrid device;
   determining a destination device based, at least in part on, a destination address in the incoming packet;
   determining a plurality of path capacities corresponding to a plurality of paths through the hybrid network from a source device associated with the incoming packet to the destination device, wherein the plurality of paths comprises at least a first path and determining a first path capacity for the first path comprises:
      determining that the first path comprises a plurality of links that traverses a same communication medium leading to self-contention for resources of the same communication medium,
      grouping the plurality of links as a first contention group, and
      determining a first contention group link capacity for the first contention group, wherein the first path capacity is determined based, at least in part, on the first contention group link capacity; and
   selecting, at the first hybrid device, one of the plurality of paths to the destination device based, at least in part, on the plurality of path capacities.

2. The method of claim 1, wherein determining the plurality of path capacities comprises determining contention groups, and wherein each contention group comprises a group of links that are associated with a same path and that use a same communication medium as other links in the group of links.

3. The method of claim 1, further comprising:
   determining link metric information of one or more links in each path, the link metric information comprising link media type or link capacity or a combination thereof.

4. The method of claim 3, wherein determining the link metric information comprises:
   sending a link query message to a second hybrid device in at least one of the plurality of paths; and
   receiving a link response message from the second hybrid device, the link response message comprising the link metric information.

5. The method of claim 1, wherein determining the first path capacity comprises:
determining the first contention group link capacity as a minimum media availability of the plurality of links in the first contention group divided by a sum of an inverse of a link rate for each of the plurality of links in the first contention group.

6. The method of claim 1, wherein determining the plurality of path capacities comprises, for each path of the plurality of paths:
grouping links in the path to define contention groups, wherein each contention group comprises a group of links that utilize a same communication medium as other links in the group of links;
defining additional contention groups for each remaining ungrouped link in the path;
determining link capacities for each contention group and for each of the additional contention groups; and
determining a minimum link capacity of the determined link capacities, wherein a determined path capacity for the path is based, at least in part, on the minimum link capacity.

7. The method of claim 1, further comprising:
grouping paths of the plurality of paths to define at least one available path group, the at least one available path group including paths to the destination device that share a legacy bridging device having paths to different relay hybrid devices;
defining available path groups for each remaining ungrouped path; and
defining an available path group path capacity for each available path group based, at least in part, on path capacities for the paths in the available path group.

8. The method of claim 7, wherein defining the available path group path capacity comprises setting the available path group path capacity equal to a lowest path capacity of the path capacities for the paths in the available path group.

9. The method of claim 7, wherein selecting comprises:
selecting one of the at least one available path group having a highest available path group path capacity; and
selecting one of the paths in the selected available path group based, at least in part on, path capacities for paths in the selected available path group.

10. The method of claim 1, wherein selecting one of the plurality of paths to the destination device comprises:
in response to the first hybrid device having a current path associated with an existing stream to the destination device, selecting the current path.

11. The method of claim 1, wherein selecting one of the plurality of paths to the destination device comprises:
selecting a path that has a hop count that does not exceed a maximum hop count of the hybrid network.

12. The method of claim 1, further comprising:
forwarding the incoming packet via an egress interface of the first hybrid device to a target interface of a next hop device in the selected path.

13. The method of claim 1, further comprising:
determining stream identification information associated with the incoming packet; and
storing an entry in a forwarding table, the entry comprising path forwarding information of the incoming packet and at least a portion of the stream identification information.

14. The method of claim 1, further comprising:
determining stream identification information associated with the incoming packet;
checking a forwarding table for an entry with at least a portion of the stream identification information; and
in response to the entry with at least a portion of the stream identification information existing in the forwarding table, forwarding the incoming packet in accordance with path forwarding information in the entry.

15. The method of claim 13, wherein the path forwarding information comprises an identifier of an egress interface of the first hybrid device and a target destination address for a next hop device in the selected path.

16. The method of claim 13, wherein the stream identification information is determined from fields of the incoming packet, the fields comprising: a source address, the destination address, a source port, a destination port, and a protocol identifier.

17. A first hybrid device comprising:
at least one local interface for communicating via a hybrid network;
a memory configured to store a topology map associated with the hybrid network; and
a processor configured to execute instructions stored in the memory that cause a path selection unit of the first hybrid device to:
determine a destination device based, at least in part, on a destination address in an incoming packet;
determine a plurality of path capacities corresponding to a plurality of paths through the hybrid network from a source device associated with the incoming packet to the destination device, wherein the plurality of paths comprises at least a first path and the instructions to determine a first path capacity for the first path comprise instructions to:
determine that the first path comprises at least a plurality of links that traverses a same communication medium leading to self-contention for resources of the same communication medium,
group the plurality of links as a first contention group, and
determine a first contention group link capacity for the first contention group, wherein the first path capacity is determined based, at least in part, on the first contention group link capacity; and
select, at the first hybrid device, one of the plurality of paths to the destination device based, at least in part, on the plurality of path capacities.

18. The first hybrid device of claim 17, wherein the instructions that cause the path selection unit to determine the plurality of path capacities comprises instructions that cause the path selection unit to determine contention groups, wherein each contention group comprises a group of links that are associated with a same path and that use a same communication medium as other links in the group of links.

19. The first hybrid device of claim 17, wherein the processor is configured to execute additional instructions that cause the path selection unit to:
determine link metric information of one or more links in each path, the link metric information comprising link media type or link capacity or a combination thereof.

20. The first hybrid device of claim 19, wherein the processor is configured to execute additional instructions that cause the path selection unit to:
send a link query message to a second hybrid device in at least one of the plurality of paths; and
receive a link response message from the second hybrid device, the link response message including the link metric information.

21. The first hybrid device of claim 17, wherein the processor is configured to execute additional instructions that cause the path selection unit to:
  determine the first contention group link capacity as a minimum media availability of the plurality of links in the first contention group divided by a sum of an inverse of a link rate for each of the plurality of links in the first contention group.

22. The first hybrid device of claim 17, wherein the at least one local interface is configured to forward the incoming packet to a target interface of a next hop device in the selected path.

23. The first hybrid device of claim 17, wherein the processor is configured to execute additional instructions that cause the path selection unit to, for each path of the plurality of paths:
  group links in the path to define contention groups, wherein each contention group comprises a group of links that utilize a same communication medium as other links in the group of links;
  define additional contention groups for each remaining ungrouped link in the path;
  determine link capacities for each contention group and for each of the additional contention groups; and
  determine a minimum link capacity of the determined link capacities, wherein a determined path capacity for the path is based, at least in part, on the minimum link capacity.

24. The first hybrid device of claim 17, wherein the processor is configured to execute additional instructions that cause the path selection unit to:
  group paths of the plurality of paths to define at least one available path group, the at least one available path group including paths to the destination device that share a legacy bridging device having paths to different relay hybrid devices;
  define available path groups for each remaining ungrouped path; and
  define an available path group path capacity for each available path group based, at least in part, on path capacities for the paths in the available path group.

25. The first hybrid device of claim 24, wherein the processor is configured to execute additional instructions that cause the path selection unit to set the available path group path capacity equal to a lowest path capacity of the path capacities for the paths in the available path group.

26. The first hybrid device of claim 24, wherein the processor is configured to execute additional instructions that cause the path selection unit to:
  select one of the at least one available path group having a highest available path group path capacity; and
  select one of the paths in the selected available path group based, at least in part, on path capacities for paths in the selected available path group.

27. The first hybrid device of claim 17, wherein the processor is configured to execute additional instructions that cause the path selection unit to:
  when the first hybrid device having a current path associated with an existing stream to the destination device, select the current path.

28. The first hybrid device of claim 17, wherein the processor is configured to execute additional instructions that cause the path selection unit to:
  select a path that has a hop count that does not exceed a maximum hop count of the hybrid network.

29. The first hybrid device of claim 17, wherein the processor is configured to execute additional instructions that cause the path selection unit to:
  determine stream identification information associated with the incoming packet; and
  store an entry in a forwarding table, the entry comprising path forwarding information of the incoming packet and at least a portion of the stream identification information.

30. The first hybrid device of claim 17, wherein the processor is configured to execute additional instructions that cause the path selection unit to:
  determine stream identification information associated with the incoming packet;
  check a forwarding table for an entry with at least a portion of the stream identification information; and
  in response to the entry with at least a portion of the stream identification information existing in the forwarding table, forward the incoming packet in accordance with path forwarding information in the entry.

31. The first hybrid device of claim 29, wherein the path forwarding information comprises an identifier of an egress interface of the first hybrid device and a target destination address for a next hop device in the selected path.

32. The first hybrid device of claim 29, wherein the stream identification information is determined from fields of the incoming packet, the fields comprising a source address, the destination address, a source port, a destination port, and a protocol identifier.

33. A non-transitory computer readable medium storing computer program code, the computer program code comprising instructions which when executed by a processor of a hybrid device cause the hybrid device to:
  determine a destination device based, at least in part, on a destination address in an ingress packet;
  identify a plurality of paths through a hybrid network from a source device associated with the ingress packet to the destination device;
  determine a plurality of path capacities corresponding to the plurality of paths, wherein the plurality of paths comprises at least a first path and the instructions to determine a first path capacity for the first path comprise instructions to:
    determine that the first path comprise at least a plurality of links that traverses a same communication medium leading to self-contention for resources of the same communication medium,
    group the plurality of links as a first contention group, and
    determine a first contention group link capacity for the first contention group, wherein the first path capacity is determined based, at least in part, on the first contention group link capacity; and
  select, at the hybrid device, one of the plurality of paths to the destination device based, at least in part, on the plurality of path capacities.

* * * * *